(12) United States Patent
Fujii

(10) Patent No.: US 10,239,699 B2
(45) Date of Patent: Mar. 26, 2019

(54) MEDICINE CONVEYING APPARATUS

(71) Applicant: Takazono Technology Incorporated, Hirakata-shi (JP)

(72) Inventor: Takayuki Fujii, Hirakata (JP)

(73) Assignee: Takazono Technology Incorporated, Hirakata-shi (JP)

( * ) Notice: Subject to any disclaimer, the term of this patent is extended or adjusted under 35 U.S.C. 154(b) by 0 days.

(21) Appl. No.: 15/757,054

(22) PCT Filed: Aug. 31, 2016

(86) PCT No.: PCT/JP2016/075572
§ 371 (c)(1),
(2) Date: Mar. 2, 2018

(87) PCT Pub. No.: WO2017/038899
PCT Pub. Date: Mar. 9, 2017

(65) Prior Publication Data
US 2018/0244476 A1 Aug. 30, 2018

(30) Foreign Application Priority Data

Sep. 4, 2015 (JP) .................................. 2015-174563

(51) Int. Cl.
*B65G 65/48* (2006.01)
*B65G 29/00* (2006.01)
(Continued)

(52) U.S. Cl.
CPC .............. *B65G 29/00* (2013.01); *B65G 65/48* (2013.01); *G06T 1/0014* (2013.01);
(Continued)

(58) Field of Classification Search
CPC ...... B65G 65/48; B65G 47/82; B65G 47/846; B65G 47/848; A61J 3/00
(Continued)

(56) References Cited

U.S. PATENT DOCUMENTS 3,588,243 A * 6/1971 Osawa et al. .......... G06K 13/02
198/468.7
6,444,936 B1 * 9/2002 Ludwig ................. B07C 5/3425
198/370.1
(Continued)

FOREIGN PATENT DOCUMENTS

JP 61-75723 * 4/1986 ............ B65G 47/08
JP 11206855 A 8/1999
(Continued)

*Primary Examiner* — James R Bidwell
(74) *Attorney, Agent, or Firm* — The Webb Law Firm

(57) ABSTRACT

A medicine conveying apparatus includes storage containers and a circulation driving unit configured to circulate the storage containers so as to make a round along a circulation path, wherein an introduction position and a discharge position are set on the circulation path, so that the medicine introduced into each storage container that has arrived at the introduction position, and the medicine is discharged from each storage container that has arrived at the discharge position, the circulation path includes a first directional path and a second directional path, and the circulation driving unit allows an operator to select one of the first and second directional paths through which the storage containers are conveyed from the introduction position to the discharge position and circulates the storage containers through the selected path.

6 Claims, 18 Drawing Sheets

(51) Int. Cl.
    *A61J 1/03*     (2006.01)
    *G06T 1/00*     (2006.01)
    *G07F 17/00*     (2006.01)

(52) U.S. Cl.
    CPC ............ *G07F 17/0092* (2013.01); *A61J 1/03* (2013.01); *B65G 2203/0208* (2013.01); *B65G 2203/041* (2013.01); *G06T 2207/30108* (2013.01)

(58) Field of Classification Search
    USPC .............................. 198/478.1, 867.11, 370.1
    See application file for complete search history.

(56) References Cited

U.S. PATENT DOCUMENTS

2014/0318078 A1    10/2014   Kondo et al.
2016/0264361 A1*   9/2016   Clusserath .............. B67C 3/242

FOREIGN PATENT DOCUMENTS

JP      2001129058 A    5/2001
WO    2013105198 A1    7/2013

\* cited by examiner

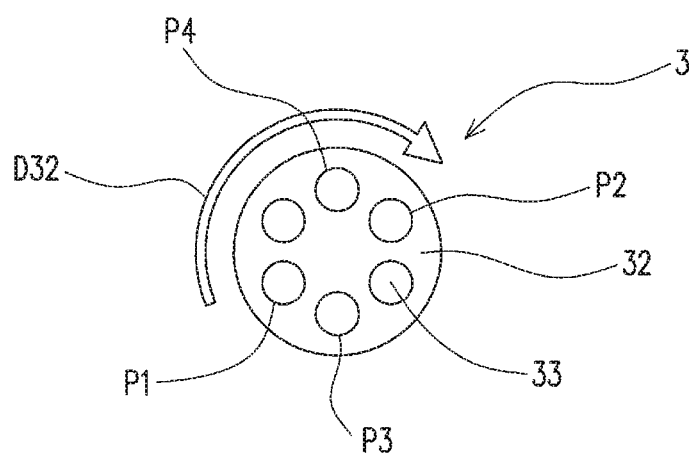

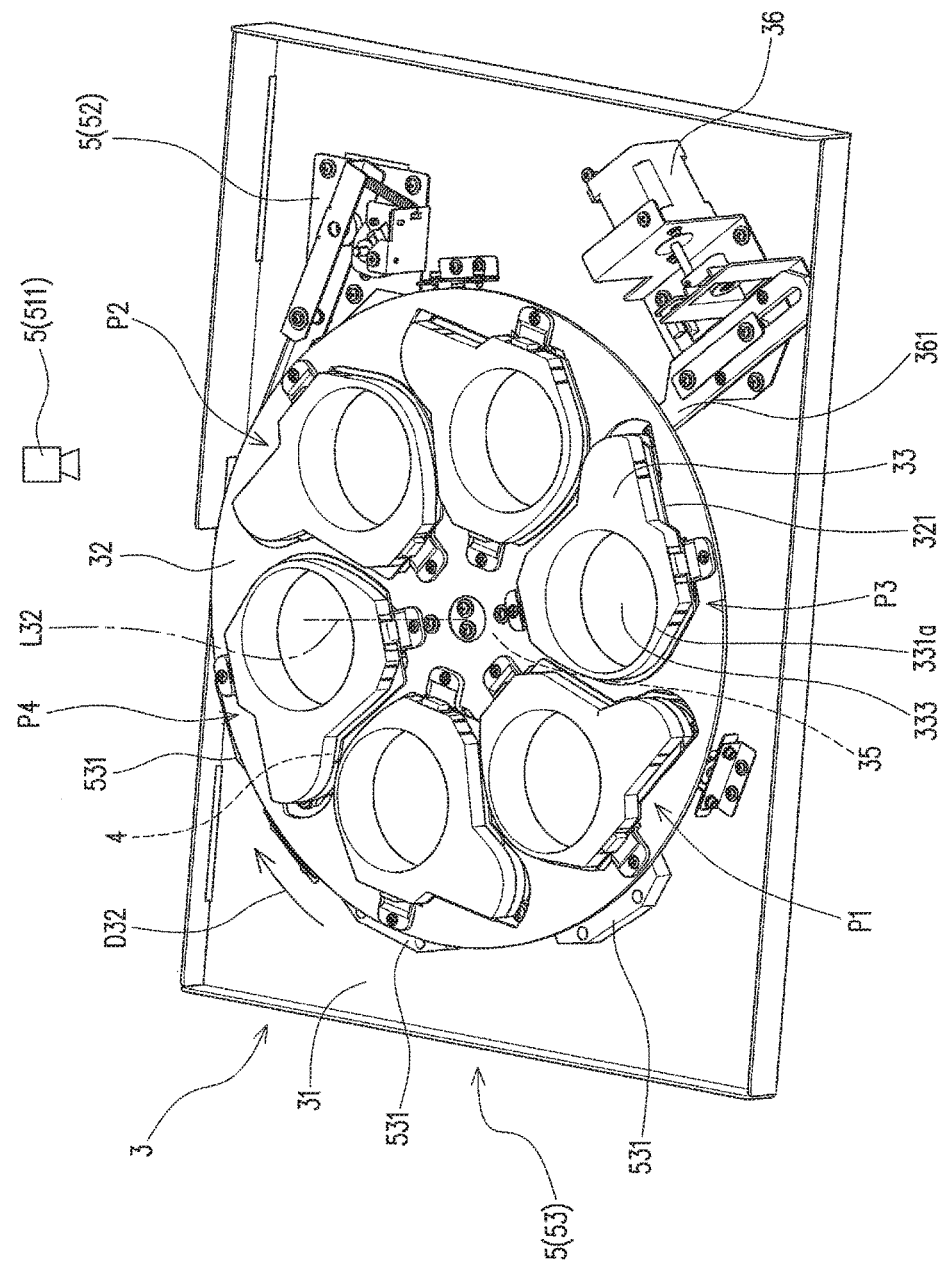

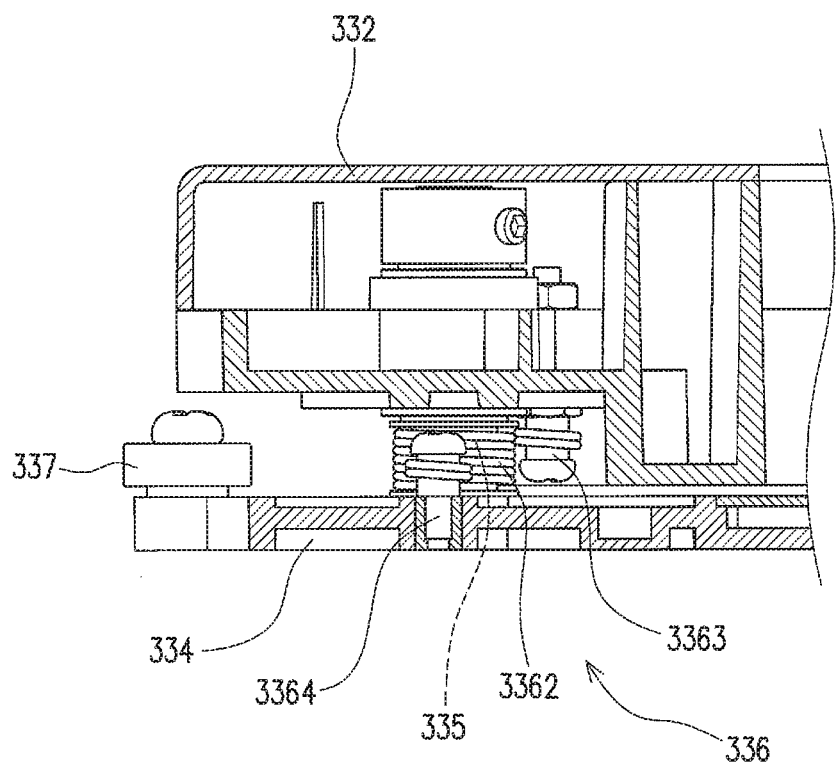

MEDICINE CONVEYING APPARATUS

CROSS-REFERENCE TO RELATED APPLICATIONS

This application is the United States national phase of International Application No. PCT/JP2016/075572 filed Aug. 31, 2016, and claims priority to Japanese Patent Application No. 2015-174563 filed Sep. 4, 2015, the disclosures of which are hereby incorporated in their entirety by reference.

FIELD OF THE INVENTION

The present invention relates to a medicine conveying apparatus configured to convey solid medicine.

BACKGROUND OF THE INVENTION

Conventionally, there are medicine conveying apparatuses configured to convey solid medicine. Examples thereof include a conveying apparatus provided in a tablet dispensing machine disclosed in Patent Literature 1. The tablet dispensing machine disclosed in Patent Literature 1 includes a tablet identification device for monitoring tablets. A conveying apparatus for feeding tablets to the tablet identification device and a conveying apparatus for taking out the tablets after being monitored from the tablet identification device and passing them to a packaging apparatus are provided. Belt conveyors are used as the respective conveying apparatuses.

In the tablet dispensing machine disclosed in Patent Literature 1, the tablets are conveyed using the conveying apparatus in the case where they are monitored, and the tablets are directly passed to the packaging apparatus by being dropped without being passed through the conveying apparatus in the case where they are not monitored. In this way, two systems of paths are provided corresponding respectively to the case where the tablets are monitored and the case where they are not monitored.

However, such a configuration leaves room for simplification. Further, in the tablet dispensing machine disclosed in Patent Literature 1, the paths of medicine (tablets) are selected depending on whether or not the conveying apparatus is used (the tablets are dropped without using the conveying apparatus), corresponding to the case where the tablets are monitored and the case where they are not monitored, but another path can be selected.

CITATION LIST

Patent Literature

Patent Literature 1: JP H11-206855 A

SUMMARY OF THE INVENTION

It is therefore an object of the present invention to provide a medicine conveying apparatus in which a path of medicine can be selected, corresponding to the situation, with a simple configuration.

An example of the configuration of the present invention is a medicine conveying apparatus configured to convey solid medicine, including: a plurality of storage containers configured to temporarily store the medicine; and a circulation driving unit configured to circulate the plurality of storage containers so as to make a round along a circulation path, wherein an introduction position and a discharge position are set on the circulation path, so that the medicine is introduced into each of the plurality of storage containers that has arrived at the introduction position, and the medicine is discharged from each of the plurality of storage containers that has arrived at the discharge position, the circulation path includes a first directional path that extends from the introduction position to the discharge position and a second directional path that extends from the introduction position to the discharge position and is different from the first directional path, and the circulation driving unit allows an operator to select one of the first directional path and the second directional path through which the plurality of storage containers are conveyed from the introduction position to the discharge position and circulates the plurality of storage containers through the selected path.

The configuration can be such that a processing unit configured to perform various kinds of processing on the medicine inside each of the plurality of storage containers is provided in the course of the first directional path, and the second directional path has a smaller length than the first directional path.

The configuration can be such that, in the case where the processing unit is actuated, the plurality of storage containers are conveyed from the introduction position to the discharge position through the first directional path, and in the case where the processing unit is not actuated, the plurality of storage containers are conveyed from the introduction position to the discharge position through the second directional path.

The configuration can be such that the processing unit includes an imaging unit configured to capture an image of the medicine present inside each of the plurality of storage containers, and an imaging position of the imaging unit is set on the first directional path, so that an image of the medicine present inside each of the plurality of storage containers that has arrived at the imaging position is captured by the imaging unit.

The configuration can be such that the processing unit further includes a determination unit configured to make a determination for monitoring, based on the image obtained by the imaging unit.

BRIEF DESCRIPTION OF DRAWINGS

FIG. 2B is a schematic view in plan view showing a holding table in a storage of the medicine packaging apparatus.

FIG. 3 is a perspective view showing the storage of the medicine packaging apparatus with a cover being omitted.

FIG. 7 is a vertical sectional view showing a main part of a biasing unit of the storage container of the medicine packaging apparatus.

DESCRIPTION OF THE INVENTION

Next, the present invention will be described with reference to an embodiment. In the following description, the vertical direction corresponds to the vertical direction in FIG. 1.

Overview

Figure 1:
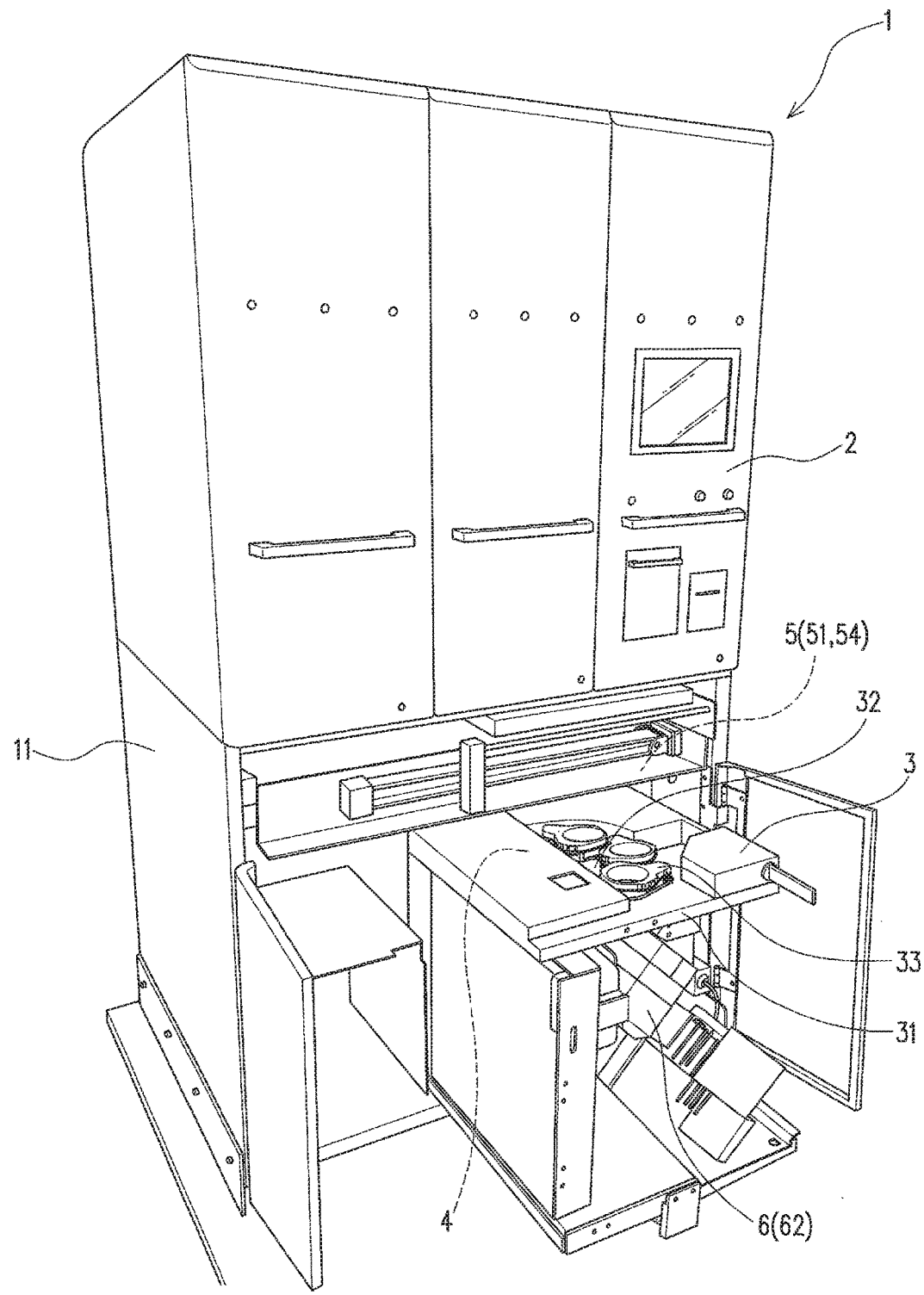
FIG. 1 is a perspective view showing a medicine packaging apparatus including a medicine conveying apparatus according to an embodiment of the present invention.
Figure 2A:
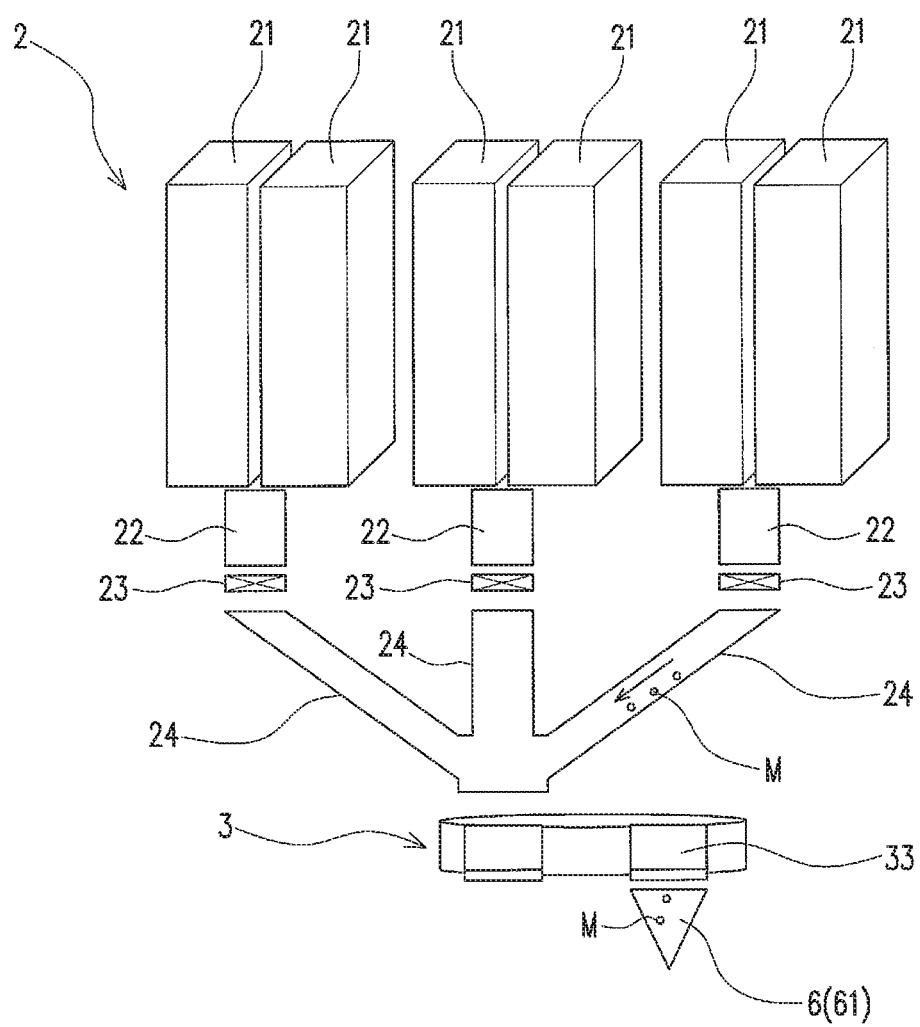
FIG. 2A is a schematic view showing an internal structure of the medicine packaging apparatus.

A medicine packaging apparatus 1 including a medicine conveying apparatus of this embodiment is used for packaging solid medicine M, for example, while being arranged on a horizontal plane, and includes a feeder 2, a storage 3, a storage container detecting unit 4, a monitoring unit 5, and a packaging unit 6. Among these, the feeder 2, the storage 3, and the packaging unit 6 are arranged within a housing 11 from the top in this order. Further, the feeder 2 and the storage 3 constitute a medicine feeding apparatus. FIG. 1 shows the appearance (in the state where the storage 3, a part of the storage container detecting unit 4, a part of the monitoring unit 5, and the packaging unit 6 are drawn out of the housing 11), and FIG. 2A schematically shows the internal structure. Elements belonging to each part are not completely separated, and some elements belong to two or more of the aforementioned parts as described below.

The solid medicine M in this embodiment is in the form that can be separated one by one so that image monitoring (to confirm whether or not the solid medicine M that matches prescription data is present using an image) is possible and is individual medicine that patients can directly take. Examples of the solid medicine M include tablets and capsules, but there is no limitation to these examples, and powder medicine may be used, depending on the case. Further, the individual solid medicine M includes each piece resulting from dividing a tablet into half or fractions.

The feeder 2 feeds the solid medicine M to the storage 3. This embodiment is configured so that the solid medicine M is fed by being dropped, but the solid medicine M can be fed by movements other than the dropping.

The feeder 2 of this embodiment includes racks 21, rack chutes 22, rack valves 23, and hopper chutes 24, sequentially from the top. A plurality of racks 21 are provided, and a plurality of cassettes (not shown) are aligned, for example, in the vertical and horizontal directions to be housed in each of the racks 21. FIG. 2A shows an example in which six columns of racks 21 are provided, but there is no limitation to this example, and the number of columns of racks can be variously changed. A plurality of pieces of solid medicine M are housed in each of the cassettes. Based on prescription data, the necessary types and quantity of solid medicine M for packaging are taken out of one or a plurality of cassettes. Each of the rack chutes 22 is a path that is provided corresponding to a plurality (two columns in this embodiment) of racks 21 and is configured to allow the solid medicine M to pass therethrough and introduce the solid medicine M taken out of the cassettes downwardly. The rack valves 23 control the feeding of the solid medicine M to the storage 3. The rack valves 23 are located, for example, at the lower ends of the rack chutes 22 and are configured to open and close the paths through which the solid medicine M pass. The positions of the rack valves 23 with respect to the rack chutes 22 and the hopper chutes 24 are not limited. The hopper chutes 24 connect the rack valves 23 to the storage 3. The hopper chutes 24 are paths that have upper ends connected to the plurality of rack valves 23 and lower parts integrated into one, with its lower end open, and are configured to allow the solid medicine M to pass therethrough, and feed the solid medicine M that has passed through the plurality of rack chutes 22 to the storage 3.

The storage 3 receives the solid medicine M fed from the feeder 2. Then, the storage 3 temporarily stores the solid medicine M. In this embodiment, the solid medicine M is put from the feeder 2 into the storage 3 at an introduction position P1 shown in FIG. 2B and FIG. 3. Then, the solid medicine M is discharged from the storage 3 to the packaging unit 6 at a discharge position P3 after the storage 3 rotates clockwise in planer view that is in a direction D32 along the first directional path, which will be described below, shown by the arrows in FIG. 2B and FIG. 3. In this way, the storage 3 of this embodiment functions as a medicine conveying apparatus configured to convey the solid medicine M. The storage 3 of this embodiment is also configured so that the solid medicine M can be discharged from the storage 3 to the packaging unit 6 at the discharge position P3 after the storage 3 rotates clockwise in planer view that is in a direction D32a shown by the arrows in FIG. 2B and FIG. 3. The detailed configuration of the storage 3 will be described later.

The storage container detecting unit 4 performs detection for driving a drive unit 35 to rotate a holding table 32 and detection for determining whether or not each storage container 33 (each of a plurality of storage containers 33) is normally held by the holding table 32. It is also possible to perform one of the two detections. The detailed configuration of the storage container detecting unit 4 will be described later.

The monitoring unit 5 is provided in the course of the first directional path, which will be described below, as a processing unit configured to perform various kinds of processing on the solid medicine M in each storage container 33 and monitors the solid medicine M fed from the feeder 2. In this embodiment, monitoring is performed using an image captured, for example, at a shooting position P2 shown in FIG. 2B and FIG. 3. The detailed configuration of the monitoring unit 5 will be described later.

The packaging unit 6 packages the solid medicine M, using a packaging material, discharged from the storage 3 and monitored at the monitoring unit 5. The packaging unit 6 includes a hopper 61 configured to receive the solid medicine M dropped from the storage 3, and a packaging mechanism 62. In the packaging mechanism 62 of this embodiment, a rolled packaging sheet which is drawn out and half-folded in the width direction is located in the opening at the lower end of the hopper 61. Thereby, the solid medicine M based on prescription data is arranged within the half-folded packaging sheet. Thereafter, the packaging sheet is bonded to form a medicine package. An example of the bonding is heat sealing. The packaging unit 6 may be configured to fill a container with the solid medicine M. An example of the container is a vial container.

Storage

The storage 3 of this embodiment is in the form shown in FIG. 3 and includes a base 31, the holding table 32, the storage containers 33, the drive unit 35, and a stored medicine discharging unit 36.

Base

The base 31 is a substantially rectangular plate part in planer view and is configured to be drawable forward out of the housing 11 of the medicine packaging apparatus 1, as shown in FIG. 1. To the base 31, the holding table 32, the drive unit 35, and the respective parts of the storage container detecting unit 4 and the monitoring unit 5, which will be described below, are assembled.

Holding Table

The holding table 32 is composed of a flat plate and is provided to be movable in the horizontal direction with respect to the base 31. The holding table 32 is circular in planer view. The holding table 32 has a holding table rotation axis L32 that is a predetermined axis in the base 31. The holding table 32 is provided rotatably about the holding table rotation axis L32. The holding table rotation axis L32 is an axis that is orthogonal to the plane direction at the center of the holding table 32 and extends in the vertical direction. The holding table 32 is rotated clockwise (direction D32) in planer view by the drive unit 35. The rotation is intermittent. In this embodiment, the velocity (the circumferential velocity and the angular velocity with reference to the holding table rotation axis L32) of the rotating holding table 32 is constant.

The holding table 32 includes a plurality of storage container holding parts 321 configured to hold the plurality of storage containers 33. Six through holes are formed through the holding table 32 of this embodiment, and the respective through holes serve as the storage container holding parts 321. The storage containers 33 are respectively fitted into the storage container holding parts 321, which thereby hold the six storage containers 33. The number of storage containers 33 held by the holding table 32 is not limited, and at least one storage container 33 may be held. With the intermittent rotation of the holding table 32, one of the six storage containers 33 is located at the introduction position P1 that is immediately below the opening at the lower end of the hopper chutes of the feeder 2, as shown in FIG. 2B and FIG. 3. At the same time, another one is located at the discharge position P3 that is immediately above the hopper of the packaging unit 6. Further, at the same time, still another one is located at the shooting position P2 corresponding to an imaging unit 51 of the monitoring unit 5, which will be described below. Further, at the same time, still another one is located at a detection position P4 corresponding to a detection unit (sensor 42) of the storage container detecting unit 4.

The storage container holding parts 321 respectively hold the storage containers 33 so as to be detachable. The through holes serving as the plurality of storage container holding parts 321 are formed at intervals from each other on the circumference with the holding table rotation axis L32 serving as the center. The intervals are set to be equal (at equal angles with reference to the holding table rotation axis L32) in the circumferential direction. Therefore, the holding table 32 holds the plurality of storage containers 33 at equal intervals on the same horizontal plane. The holding table 32 holds the plurality of storage containers 33 at intervals from each other on the circumference with the holding table rotation axis L32 serving as the center.

Storage Containers

Figure 4:
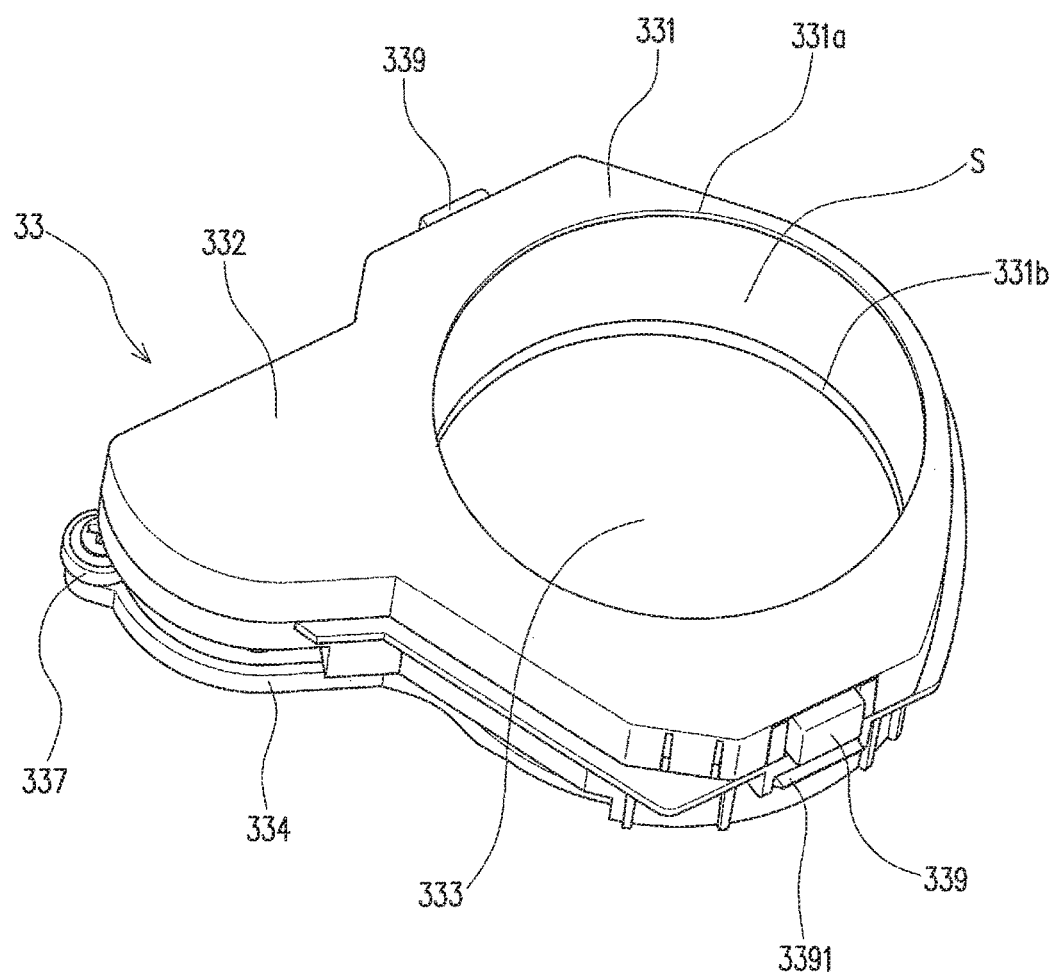
FIG. 4 is a perspective view showing a storage container of the medicine packaging apparatus.

The storage containers 33 are in the form shown in FIG. 4 and are configured to receive the solid medicine M fed from the feeder 2 and temporarily store it. The storage containers 33 are configured to be capable of dropping the stored solid medicine M into the packaging unit 6, as needed. Each of the storage containers 33 includes a frame 331, and a bottom part 333 located below the frame 331 and configured to be movable with respect to the frame 331. The frame 331 of the storage container 33 is held by the corresponding storage container holding part 321 of the holding table 32. Therefore, the storage container 33 is held by the holding table 32 at an intermediate position in the vertical direction. Therefore, as shown in FIG. 3, the lower part of the storage container 33 is embedded in the holding table 32, and thus the vertical dimension of the medicine packaging apparatus 1 can be reduced.

Figure 5:
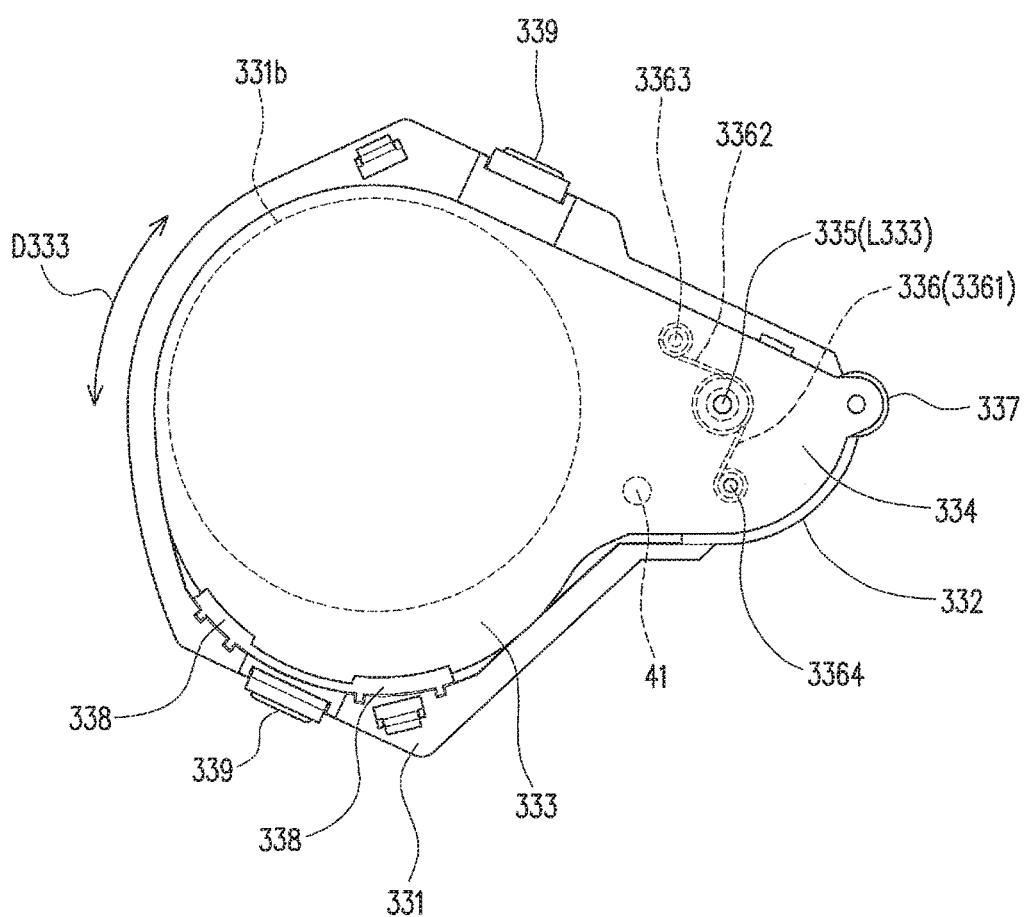
FIG. 5 is a bottom view showing the closed state of the storage container of the medicine packaging apparatus.
Figure 6:
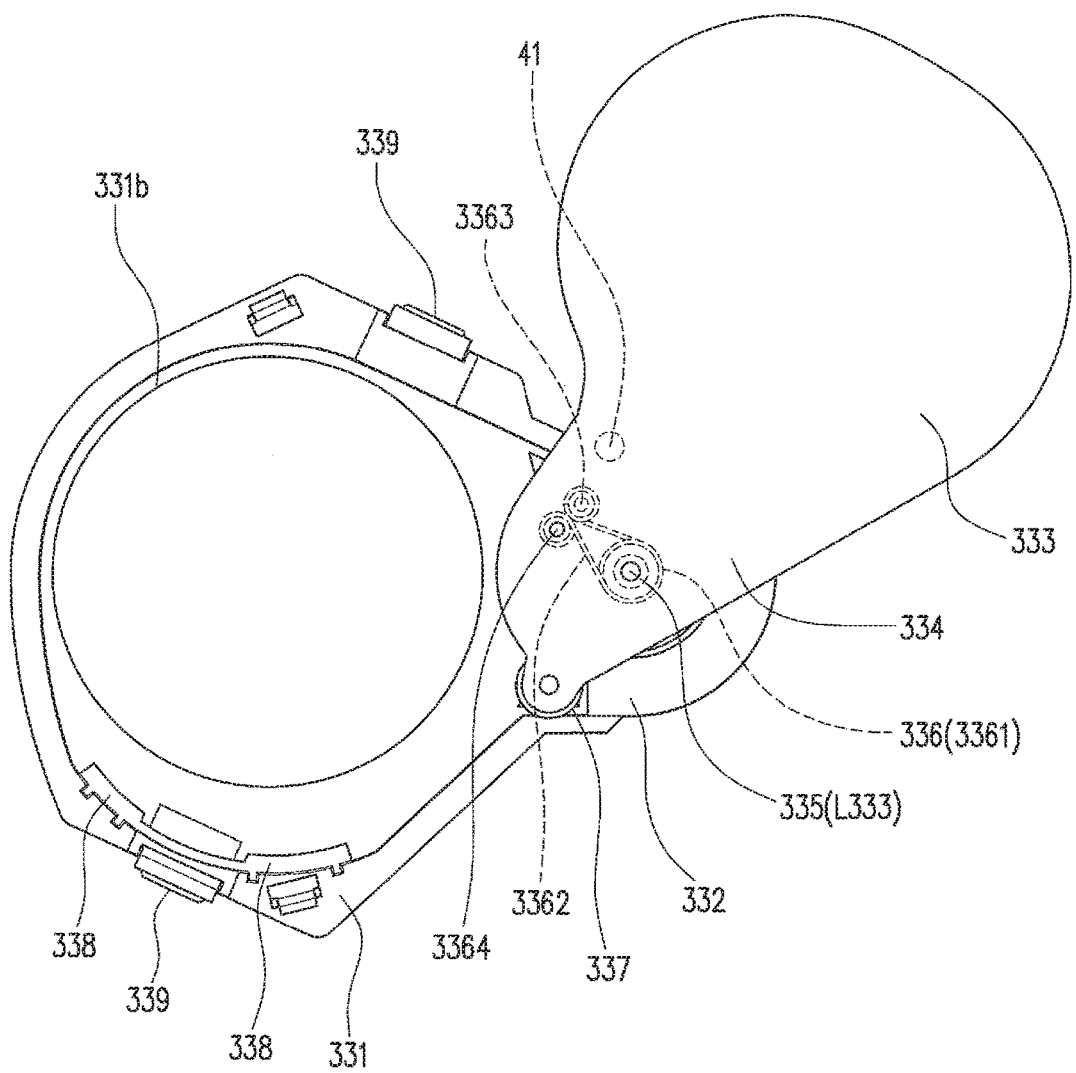
FIG. 6 is a bottom view showing the open state of the storage container of the medicine packaging apparatus.

The frame 331 forms a storage space S configured to store the solid medicine M in cooperation with the bottom part 333. Therefore, the upper end and the lower end of the frame 331 are open. The opening shape is circular in plan view. An upper opening 331*a* of the frame 331 is constantly open so as to introduce the solid medicine M fed from the feeder 2 into the storage container 33. On the other hand, a lower opening 331*b* can be opened and closed by the bottom part 333. The opening and closing direction is the horizontal direction. The bottom part 333 is movable between an open state in which downward communication is possible and a closing state in which the communication is impossible (FIG. 5 shows the closing state, and FIG. 6 shows the open state) for the opening and closing. By the opening of the bottom part 333, the solid medicine M can be dropped through the lower opening 331*b* of the frame 331 to be discharged from the storage container 33. The bottom part 333 moves parallel to the lower opening 331*b* of the frame 331. Accordingly, the solid medicine M on the bottom part 333 can be swept by the inner surface of the lower opening 331*b* of the frame 331, and therefore the solid medicine M can be reliably discharged from the storage container 33 by moving the solid medicine M. The bottom part 333 is supported so as to be pivotable in a direction D333 shown in FIG. 5 within a specific range with respect to the lower surface of the frame 331. Therefore, the bottom part 333 can be reciprocally moved in specific directions (vibration directions) by vibration mechanisms 52 and 53, which will be described below. In this embodiment, when the bottom part 333 pivots 10° or more about an axial center (which coincides with a bottom-part pivot axis L333) of a coupler 335, the open state is established. The bottom part 333 of this embodiment pivots up to 90°.

The bottom part 333 can be moved with respect to the frame 331 while maintaining the closing state so that the solid medicine M is not dropped. Specifically, as shown in FIG. 5, the bottom part 333 is formed within a range including an oval having a major diameter larger than the opening shape (shown by a dashed line in the figure) of the circle (specifically, perfect circle) of the frame 331. The reciprocal movement of the bottom part 333 in the direction of the major diameter can prevent the lower opening 331*b* from being opened even in the reciprocal movement, and therefore the bottom part 333 can maintain the closing state (the state where the lower opening 331b is closed). In this embodiment, even if the bottom part 333 pivots less than 10° about the axial center (the bottom-part pivot axis L333) of the coupler 335, the closing state can be maintained.

The bottom part 333 can hold the solid medicine M in the storage space S (specifically, on the upper surface of the bottom part 333) when the lower opening 331b of the frame 331 is closed and can drop the solid medicine M that has been held in the storage space S when it is open. Further, the bottom part 333 can move the solid medicine M by sliding it on the bottom part 333, by being reciprocally moved while maintaining the closing state. Thereby, a plurality of types (pieces) of solid medicine M are separated from each other on the bottom part 333, and therefore the monitoring accuracy by the monitoring unit 5 can be improved.

For the pivotable support, each of the storage containers 33 includes a frame-side extending part 332 and a bottom-side extending part 334. The frame-side extending part 332 is continuous with the frame 331 and horizontally extends outwardly of the frame 331 (in the opposite direction of the storage space 5). The bottom-side extending part 334 is continuous with the bottom part 333 and horizontally extends to be opposed to the frame-side extending part 332 at a specific opposing distance downwardly. In this embodiment, the frame 331 and the frame-side extending part 332 are integrally formed, and the bottom part 333 and the bottom-side extending part 334 are integrally formed. The frame-side extending part 332 and the bottom-side extending part 334 are coupled together by the coupler 335 located between the frame-side extending part 332 and the bottom-side extending part 334. The coupler 335 has the bottom-part pivot axis L333. The coupler 335 couples the frame-side extending part 332 and the bottom-side extending part 334 so as to be pivotable about the bottom-part pivot axis L333. That is, the axial center of the coupler 335 coincides with the bottom-part pivot axis L333. The bottom-part pivot axis L333 is a vertical axis. Each of the storage containers 33 includes a biasing part 336 located between the frame-side extending part 332 and the bottom-side extending part 334 and configured to bias the bottom part 333 in the closing direction (direction in which the bottom part 333 is rendered in the closing state). Such configuration of the storage container 33 can reduce the vertical dimension of the storage container 33 so as to reduce the vertical dimension of the medicine packaging apparatus 1.

Further, the biasing part 336 functions as at least a part of a maintaining unit configured to maintain the bottom part 333 in the closing state when the storage container 33 is detached from the holding table 32. Since the maintaining unit includes the biasing part 336 in this way, thereby allowing the bottom part 333 to be maintained in the closing state when the storage container 33 is detached from the holding table 32, the residue remaining in the storage container 33 is less likely to fall down into the medicine packaging apparatus 1. Therefore, the bottom part 333 can be maintained in the closing state with a simple configuration.

The biasing part 336 has a coil 3361. As shown in FIG. 7, the coil 3361 includes a torsion coil spring member 3362, a frame-side locking tool 3363, and a bottom-side locking tool 3364. The torsion coil spring member 3362 is attached to the coupler 335. Specifically, the torsion coil spring member 3362 is externally fitted to the coupler 335. The frame-side locking tool 3363 is provided in the frame-side extending part 332 and is configured to engage one end of the torsion coil spring member 3362. The bottom-side locking tool 3364 is provided in the bottom-side extending part 334 and is configured to engage the other end of the torsion coil spring member 3362. The one end of the torsion coil spring member 3362 is attached to the frame-side locking tool 3363 so as not to be disengaged. The other end of the torsion coil spring member 3362 is attached to the bottom-side locking tool 3364 so as not to be disengaged.

For such attachment, head screws are, for example, used as the frame-side locking tool 3363 and the bottom-side locking tool 3364. The one end of the torsion coil spring member 3362 is formed into a ring that is larger than the shank of the frame-side locking tool 3363 and smaller than the head thereof, and the other end of the torsion coil spring member 3362 is formed into a ring that is larger than the shank of the bottom-side locking tool 3364 and smaller than the head thereof, thereby preventing disengagement.

According to these configurations, even if the torsion coil spring member 3362 breaks due to fatigue, fragments generated by the breakage can be rendered as they are, in the state of being attached or caught to any one of the coupler 335, the frame-side locking tool 3363, and the bottom-side locking tool 3364, in most cases. Therefore, the occurrence of foreign matter contamination accident due to the fragments falling down into the packaging unit 6 and being accidentally packaged together with the solid medicine M can be suppressed.

The frame-side locking tool 3363 is provided so as to have a total length larger than the specific opposing distance between the frame-side extending part 332 and the bottom-side extending part 334, to have a part (the part of the shank of the head screw) embedded in the frame-side extending part 332, and to be constantly opposed to the bottom-side extending part 334 even if the lower opening 331b is opened or closed by the bottom part 333.

The bottom-side locking tool 3364 is provided so as to have a total length larger than the specific opposing distance between the frame-side extending part 332 and the bottom-side extending part 334, to have a part (the part of the shank of the head screw serving as the frame-side locking tool 3363) embedded in the bottom-side extending part 334, and to be constantly opposed to the frame-side extending part 332 even if the lower opening 331b is opened or closed by the bottom part 333.

According to these configurations, the occurrence of foreign matter contamination accident due to the frame-side locking tool 3363 or the bottom-side locking tool 3364 being loosened or the like to be unexpectedly disengaged, falling down into the packaging unit 6, and being accidentally packaged together with the solid medicine M can be suppressed.

Each of the storage containers 33 includes a pressed part 337. The pressed part 337 is formed at the end of the bottom-side extending part 334 on the opposite side of the bottom part 333. The pressed part 337 is pressed by a pressing part 3611 of the stored medicine discharging unit 36 so that the bottom part 333 is moved to open the lower opening 331b (for example, in the state shown in FIG. 6). Further, the pressed part 337 is pressed by a pressing part 5211 of the vibration mechanism (first vibration mechanism 52) (see FIG. 13) so that the bottom part 333 is reciprocally moved in the specific vibration directions.

Figure 8A:
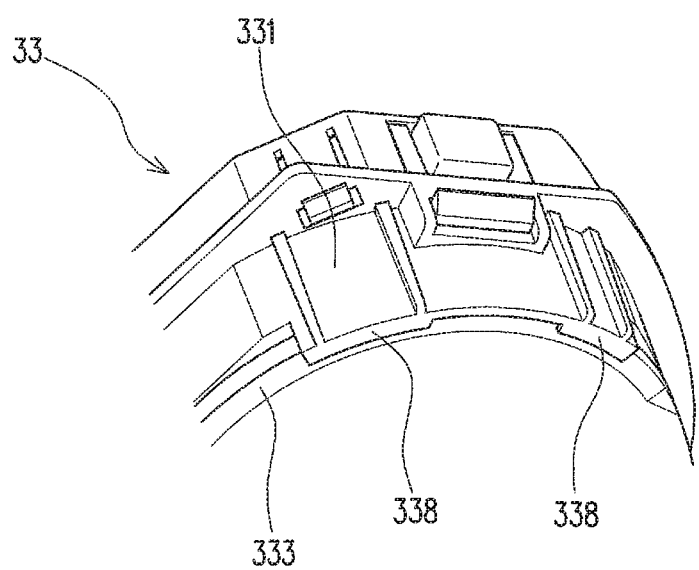
FIG. 8A is a perspective view showing a main part on the bottom side of a support unit of the storage container of the medicine packaging apparatus.

Each of the storage containers 33 includes a support part 338 provided between the frame 331 and the bottom part 333 and configured to engage the bottom part 333 to support it from below when the bottom part 333 is in the closing state. Specifically, the support part 338 is formed as a projection projecting inwardly (in the direction facing the storage space 5) from the frame 331, as shown in FIG. 8A. Such a configuration can prevent the bottom part 333 from being lowered from the frame 331 and therefore can prevent leakage of the solid medicine M through the gap in the vertical direction between the frame 331 and the bottom part 333.

Figure 8B:
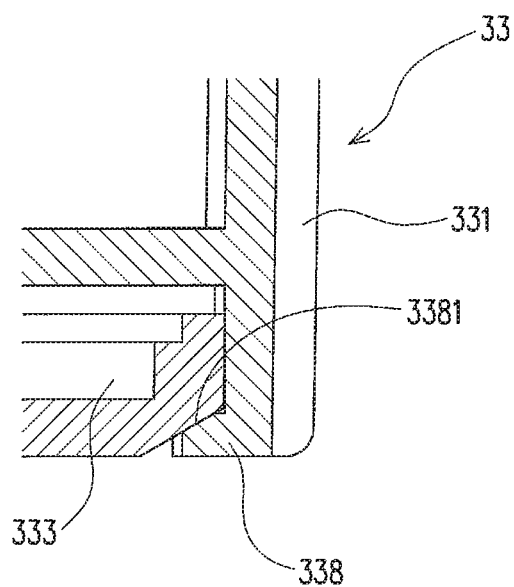
FIG. 8B is a vertical sectional view showing a main part of the support unit of the storage container of the medicine packaging apparatus.

The support part 338 includes a guide part 3381 configured to guide the bottom part 333 upwardly as the bottom part 333 travels in the closing direction. Specifically, the guide part 3381 is formed as an inclined surface formed on the top of the support part 338, as shown in FIG. 8B. Such a configuration can reduce the gap in the vertical direction between the frame 331 and the bottom part 333 in the closing state so as to prevent leakage of the solid medicine M.

Figure 9:
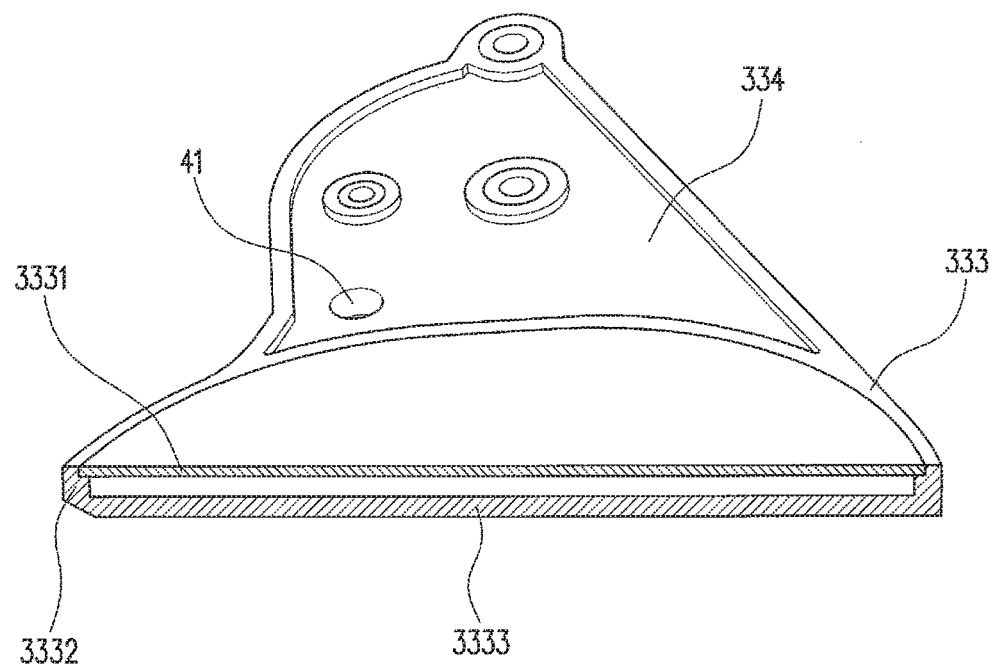
FIG. 9 is a perspective view showing the vertical cross section of the bottom part of the storage container of the medicine packaging apparatus.

As shown in FIG. 9, the bottom part 333 includes a receiving part 3331 configured to receive the solid medicine M fed by being dropped from the feeder 2. The receiving part 3331 is formed into a thin plate shape. Further, the receiving part 3331 is configured to enable downward elastic deformation. Specifically, the receiving part 3331 is a flat plate made of a resin material. Such a configuration can mitigate the impact of dropping with an inexpensive configuration so as to prevent bounce of the solid medicine M. For at least the upper surface of the receiving part 3331, a color that facilitates image monitoring can be employed.

The bottom part 333 includes a holding part 3332 configured to hold the circumferential edge of the receiving part 3331. Specifically, the holding part 3332 is formed as a step configured to coincide with the circumferential edge of the bottom part 333, and the receiving part 3331 is fitted into the holding part 3332 that is the step. The circumferential edge of the receiving part 3331 is fixed by the holding part 3332. Therefore, the shape of the receiving part 3331 can be retained by the holding part 3332.

The bottom part 333 includes a reinforcing part 3333 configured to reinforce the holding part 3332. The reinforcing part 3333 is continuous with the holding part 3332 and is provided below the receiving part 3331 with a spacing. The reinforcing part 3333 of this embodiment is a flat plate-shaped portion located one step lower than the holding part 3332 that is the step. An air layer that can function as a cushion is formed by the reinforcing part 3333 in an amount of the spacing provided above. The air layer allows elastic deformation of the receiving part 3331 in the vertical direction. Therefore, the holding part 3332 can be reinforced without inhibiting the elastic deformation.

The storage container 33 is detached from the holding table 32 with the upper opening 331a that is the opening shown in FIG. 3 facing upward. Therefore, the upper opening 331a is not oriented laterally or downward, so that the residue remaining within the storage container 33 does not fall down into the medicine packaging apparatus 1.

Further, the storage container 33 is configured to be held by the holding table 32 in an engaged state. As shown in FIG. 4, the storage container 33 includes operation pieces 339 that are operated inwardly of the upper opening 331a that is the opening. A pair of operation pieces 339 are provided so as to be located on both sides with the upper opening 331a interposed therebetween. Each of the operation pieces 339 includes a claw 3391 in its lower part, and the claw 3391 engages an edge (more specifically, an engaged member fixed to the edge) of a through hole that is each one of the storage container holding parts 321 of the holding table 32, thereby allowing the storage container 33 to be held by the holding table 32. The pair of operation pieces 339 are operated by an operator so as to be pinched from both sides inwardly of the upper opening 331a. When the operation pieces 339 are operated in this way, the claws 3391 also move inwardly, and therefore the engaged state of the storage container 33 with the holding table 32 is released. Since the pair of operation pieces 339 are operated so as to be pinched from both sides inwardly of the upper opening 331a, the hand of the operator covers over the upper opening 331a when the engagement is released. Accordingly, the upper opening 331a is closed by the hand of the operator. Therefore, when the storage container 33 is detached from the holding table 32, the residue remaining within the storage container 33 is further less likely to fall down, and the residue can be reliably collected. The operation pieces 339 are not necessarily provided as a pair and any one of them may be provided alone.

Drive Unit

The drive unit 35 drives the holding table 32 to rotate so as to move the storage containers 33 held by the holding table 32. The movement is horizontal movement. The driving is performed so as to rotate the holding table 32 about the holding table rotation axis L32. The driving is intermittent driving. The drive unit 35 of this embodiment includes a motor, which is not shown, provided on the bottom surface of the base 31, a driving force transmission mechanism such as a gear connected to the motor, and a rotation shaft coinciding with the holding table rotation axis L32 and extending downwardly from the center of the holding table 32. The drive shaft of the motor may be directly connected to the rotation shaft without the intermediation of the driving force transmission mechanism.

As described above, the holding table 32 is rotatably provided, and the drive unit 35 drives the holding table 32 to rotate about the holding table rotation axis L32, with the holding table 32 holding the plurality of storage containers 33 on its circumference, so that the storage containers 33 can be horizontally moved with a simple configuration.

The drive unit 35 moves the storage containers 33 between the introduction position P1 where the solid medicine M is introduced from the feeder 2 and the discharge position P3 where the solid medicine M is discharged to the packaging unit 6. The storage containers 33 are sequentially moved to the discharge position P3 by the drive unit 35 that performs the intermittent driving.

Thus, the driving unit 35 serves as a circulation driving unit and can circulate the plurality of storage containers 33 so as to make a round along the circulation path. The circulation path of this embodiment forms a circular path by the plurality of storage containers 33 being arranged in the circumferential direction on the holding table 32 and the holding table 32 rotating about the holding table rotation axis L32. The introduction position P1 and the discharge position P3 are set on the circulation path. The solid medicine M is configured to be introduced into each storage container 33 that has arrived at the introduction position P1, and the medicine is configured to be discharged from each storage container 33 that has arrived at the discharge position P3.

As the circulation path, a first directional path (the path extending in the direction D32 that is clockwise in planer view in FIG. 2B) that extends from the introduction position P1 to the discharge position P3 and a second directional path (the path extending in the direction D32a that is counterclockwise in planer view in FIG. 2B) that extends from the introduction position P1 to the discharge position P3 and is different from the first directional path are set in this embodiment. When conveying the plurality of storage containers 33 from the introduction position P1 to the discharge position P3, the operator can select whether to convey them through the first directional path or through the second directional path by selecting the rotational direction of the holding table 32.

Specifically, the driving unit 35 of this embodiment is configured to be capable of selecting the rotational direction of the holding table 32 between the rotation in one direction (forward rotation) and the rotation in the other direction (reverse rotation). In this embodiment, the rotation in the one direction (forward rotation) is clockwise in planer view, and the rotation in the other direction (reverse rotation) is counterclockwise in planer view. The selection of the rotational direction by the operator enables the solid medicine M to be conveyed from the introduction position P1 to the discharge position P3, passing through a path that is convenient for the conveyance. The monitoring unit 5 (particularly, the imaging unit 51 thereof) is provided in the course of the first directional path.

The driving unit 35 rotates the holding table 32 so that the storage containers 33 are moved in the selected direction (the one or the other direction) and are stopped at a plurality (six points in this embodiment) of stop positions in the course of the movement. The plurality of stop positions include the introduction position P1, the discharge position P3, the shooting position P2 which is provided between the introduction position P1 and the discharge position P3 and at which an image of the solid medicine M is captured by the imaging unit 51, which will be described below, and a plurality (two points in this embodiment) of intermediate stop positions provided between the introduction position P1 and the shooting position P2. The detection position P4, which will be described below, is one of the intermediate stop positions. Further, one intermediate stop position is provided between the shooting position P2 and the discharge position P3. This is for ensuring the time in a determination unit 54 of the monitoring unit 5 to process the image of the solid medicine M captured at the shooting position P2. Further, this is also for stopping the operation of the medicine packaging apparatus 1 before the solid medicine M is discharged from the storage container 33, if the solid medicine M within the storage container 33 is different from the prescription data, as a result of the determination by the determination unit 54 of the monitoring unit 5. By stopping the operation of the medicine packaging apparatus 1 before the solid medicine M is discharged from the storage container 33, it is possible to prevent the solid medicine M that is different from the prescription data from being packaged.

The driving unit 35 makes the forward rotation when the monitoring is performed. In this case, the storage containers 33 move from the introduction position P1 to the discharge position P3 through the first directional path. On the other hand, the rotation is reversed when the monitoring is not performed. In this case, the storage containers 33 move from the introduction position P1 to the discharge position P3 through the second directional path. As shown in FIG. 2B and FIG. 3, the length from the introduction position P1 to the discharge position P3 of the first directional path in this embodiment is equivalent to the distance of five of the plurality of storage containers 33 are aligned in the circumferential direction of the holding table 32 at intervals. Meanwhile, the length of the second directional path is equivalent to the distance of one of the plurality of storage containers 33 aligned in the circumferential direction of the holding table 32 at intervals. In this way, the length of the second directional path is set smaller than the length of the first directional path. Thus, the rotational direction of the driving unit 35 can be selected, and therefore the storage containers 33 can be conveyed quickly through the second directional path having a short path length (that is, short-cutting the path) in the case where any processing (such as the monitoring using the image of the solid medicine M captured by the imaging unit 51 in this embodiment) is not performed on the medicine. Accordingly, the path from the introduction position P1 to the discharge position P3 can be changed depending on the case of performing or not performing the monitoring. Therefore, the solid medicine M can be efficiently conveyed by reducing the time required for the conveyance, depending on the actuation situation of the monitoring unit 5, and thus the solid medicine M can be packaged quickly.

Further, in the case where errors and the like have occurred in the medicine conveying apparatus, the medicine in the storage containers 33 needs to be collected once for restoration. At this time, if the storage containers 33 move from the introduction position P1 to the discharge position P3 through the second directional path, the number of storage containers 33 holding the medicine is reduced, as compared with the case of moving through the first directional path, and therefore the amount of medicine to be collected from the storage containers 33 can be reduced.

Specifically, in this embodiment, in the case where the storage containers 33 move from the introduction position P1 to the discharge position P3 through the first directional path, the medicine needs to be collected from the six storage containers 33 including not only the storage containers 33 located at the introduction position P1 and the discharge position P3 but also the storage containers on the first directional path. In contrast, in the case where the storage containers 33 move from the introduction position P1 to the discharge position P3 through the second directional path, the medicine needs to be collected only from the two storage containers 33 located at the introduction position P1 and the discharge position P3.

Accordingly, in no need of the monitoring, the amount of medicine to be collected from the storage containers 33 for restoration when errors and the like have occurred in the medicine conveying apparatus can be reduced by configuring the storage containers 33 to move from the introduction position P1 to the discharge position P3 through the second directional path.

Stored Medicine Discharging Unit

Figure 10:
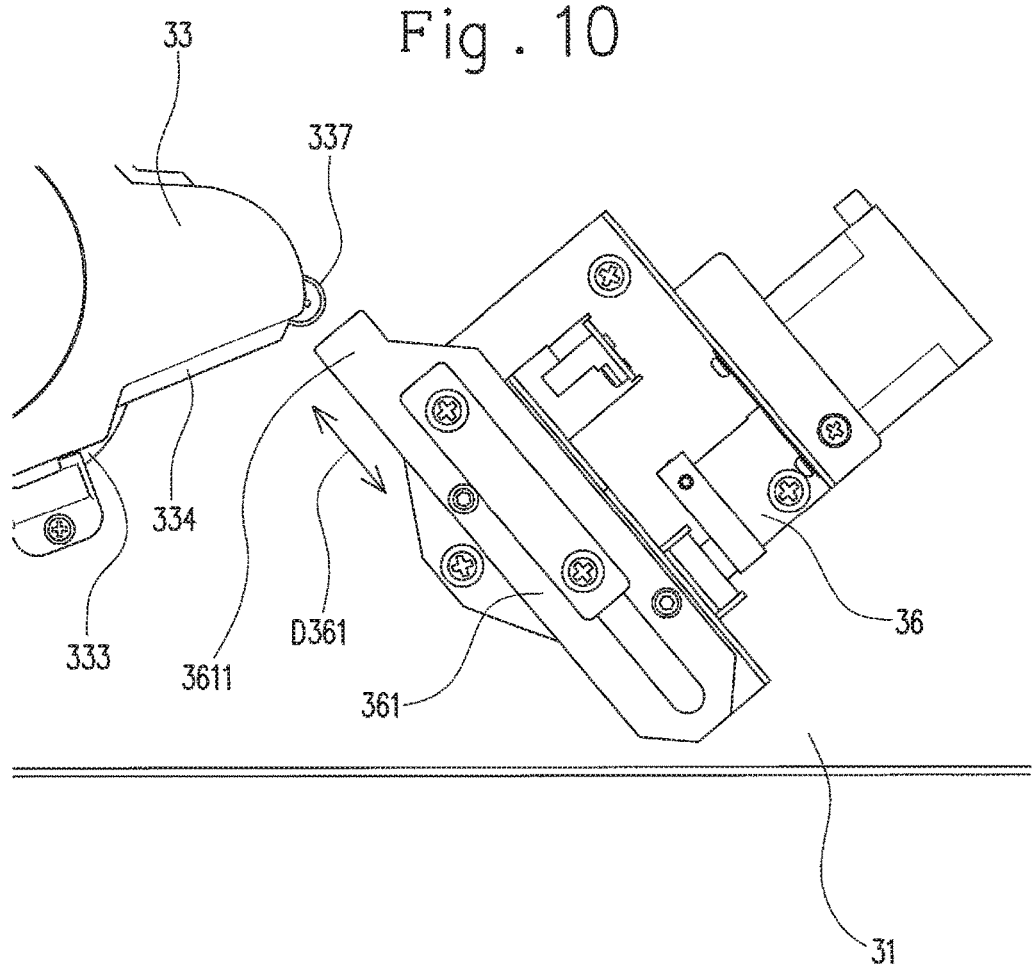
FIG. 10 is a plan view showing a stored medicine discharging unit of the medicine packaging apparatus.

As shown in FIG. 10, the stored medicine discharging unit 36 is provided on the base 31 and includes a rod-shaped part 361 configured to reciprocally move in a longitudinal direction D361. The pressing part 3611 located at the distal end of the rod-shaped part 361 presses the pressed part 337 of the storage container 33, thereby allowing the bottom part 333 and the bottom-side extending part 334 to move to the state shown in FIG. 6 so as to open the lower opening 331b of the frame 331, so that the solid medicine M can be dropped into the packaging unit 6.

Summary of Storage

As shown in FIG. 1, the storage 3 configured as above can be drawn in the horizontal direction from the housing 11. Each of the storage containers 33 is detached from the holding table 32 by being moved upwardly. Since the storage 3 is located at an intermediate position in the vertical direction, which is not excessively high or low, in the medicine packaging apparatus 1, it is easy to draw the storage 3 and to attach and detach the storage container 33. Therefore, cleaning of the storage containers 33 can be facilitated.

According to the storage 3 configured as above, the storage containers 33 can be individually attached or detached, and the storage containers 33 can be cleaned in the detached state. Therefore, cleaning of the storage containers 33 can be facilitated.

Storage Container Detecting Unit

Figure 11:
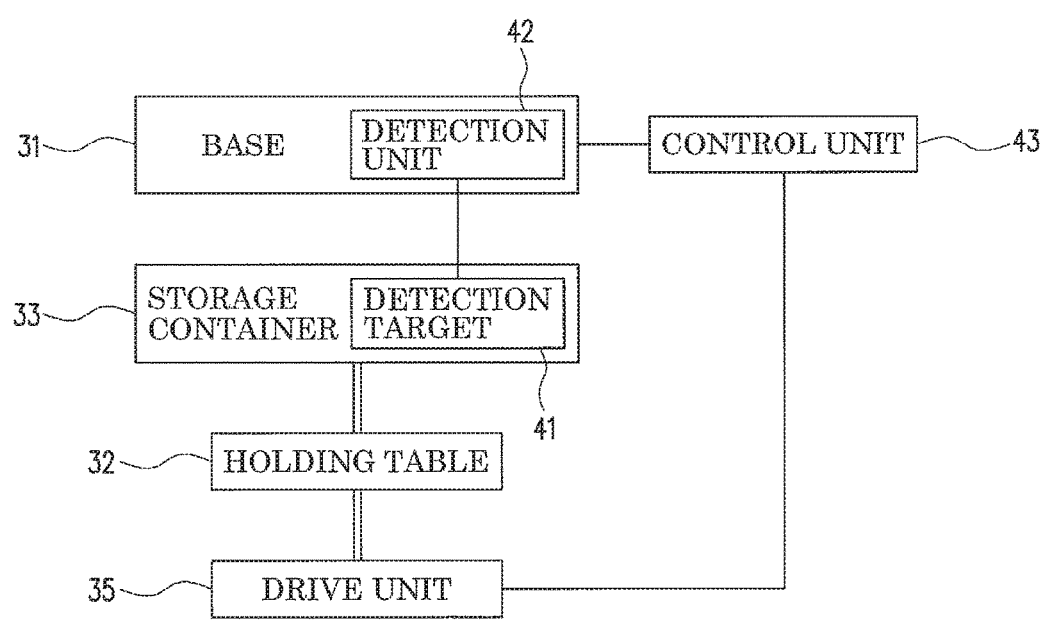
FIG. 11 is a block diagram showing a storage container detection unit of the medicine packaging apparatus.

The storage container detecting unit (medicine storage device) 4 includes the base (31), the holding table (32), the storage container (33), the drive unit (35), a detection target 41, the sensor 42 serving as the detection unit, and a control unit 43. A schematic block diagram is shown in FIG. 11. The holding table (32), the storage container (33), and the drive unit (35) also belong to the storage 3, as described above (overlapping descriptions for these components belonging also to the storage 3 are omitted herein).

Detection Target

The detection target 41 is provided in each of the storage containers 33. In this embodiment, one detection target 41 is provided for each of the storage containers 33. The detection target 41 of this embodiment includes a permanent magnet.

The detection target 41 is provided in the bottom part 333 capable of opening and closing the lower opening 331b of the storage container 33 or the bottom-side extending part 334 that is integrated with the bottom part 333. As shown by the dashed line in FIG. 5, the detection target 41 of this embodiment is provided in the bottom-side extending part 334. Therefore, when the bottom part 333 is in the closing state, detection can be made by the sensor 42 provided on the base 31. On the other hand, when the bottom part 333 is in the open state, the detection target 41 moves and is therefore undetectable by the sensor 42. According to this configuration, even if the storage container 33 is held by the holding table 32, it can be determined that the storage container 33 is not normally held by the holding table 32 when the bottom part 333 of the storage container 33 is in the open state.

Detection Unit

Figure 12:
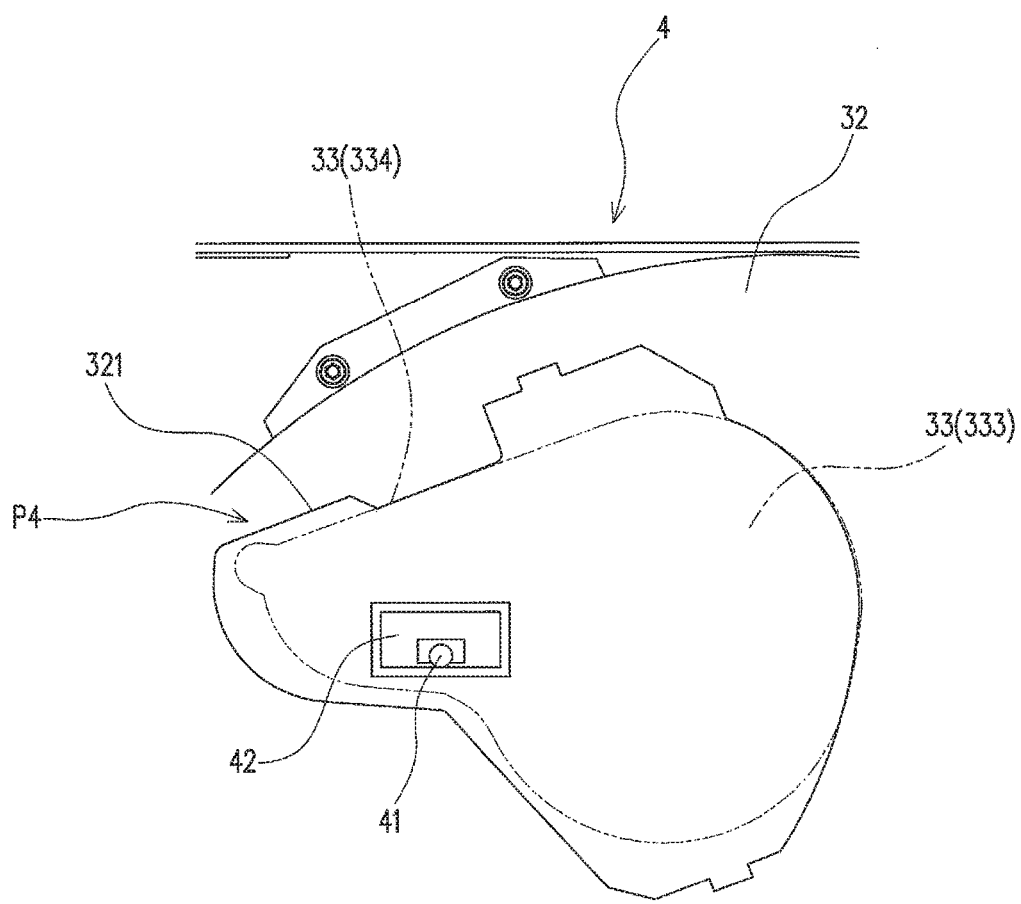
FIG. 12 is a plan view showing the storage container detection unit of the medicine packaging apparatus.

As shown in FIG. 12, the sensor 42 serving as the detection unit is provided at a position vertically opposed to the detection target 41 of the storage container 33 (shown by the dashed line) that is located at the detection position P4 on the base 31. The sensor 42 detects the detection target 41 of the storage container 33 that has arrived at the detection position P4. The detection position P4 is arranged, on the circumference of the holding table 32 on which the plurality of storage containers 33 are held, at a distance that is an integer multiple of the interval between the storage containers 33 from the discharge position P3. Incidentally, the introduction position P1 is also arranged on the circumference at a distance that is an integer multiple of each interval between the storage containers 33 from the discharge position P3. The sensor 42 of this embodiment is a magnetic sensor (hole sensor). Therefore, the detection target 41 and the sensor 42 can be implemented by a general configuration of such combination of the permanent magnet and the magnetic sensor.

Control Unit

The control unit 43 rotates the holding table 32 by the drive unit 35 based on the detection results by the sensor 42. The holding table 32 is rotated so that the storage containers 33 are sequentially moved to the discharge position. Further, the control unit 43 determines whether or not the storage containers 33 are normally held by the holding table 32.

The control unit 43 rotates the holding table 32 by the drive unit 35 so that all the detection targets 41 of the storage containers 33 held by the holding table 32 can be detected by the sensor 42. During the rotation, if all the detection targets 41 of the storage containers 33 could be detected by the sensor 42, it is determined that all the storage containers 33 are normally held by the holding table 32, whereas if any one of the detection targets 41 of the storage containers 33 could not be detected by the sensor 42, it is determined that any one of the plurality of storage containers 33 is not normally held by the holding table 32. Thus, whether or not all the storage containers 33 are normally held by the holding table 32 can be determined.

The control unit 43 can control the normal operation of packaging the solid medicine M and the initial operation that is performed only at the beginning of the driving of the medicine packaging apparatus 1 before the normal operation, as follows.

As an example, the control unit 43 stops the rotation of the holding table 32 by the drive unit 35 if the detection target 41 is detected by the sensor 42 during the rotation of the holding table 32 by the drive unit 35 in the normal operation. Thus, each of the storage containers 33 can be stopped at the discharge position P3.

In the rotation of the holding table 32, the control unit 43 drives the drive unit 35 to rotate the holding table 32 so that the storage containers 33 are moved by at least a specific distance that is equivalent to the intervals between the storage containers 33 on the circumference. During this period, if the detection target 41 could not be detected by the sensor 42, it is determined by the control unit 43 that any one of the plurality of storage containers 33 is not normally held by the holding table 32. Thus, in the normal operation, whether or not the storage containers 33 are normally held by the holding table 32 can be determined.

As another example, the control unit 43 determines whether or not the detection target 41 is detected by the sensor 42 before the holding table 32 is rotated by the drive unit 35, in the normal operation. As a result, if the detection target 41 is detected, the control unit 43 rotates the holding table 32 by the drive unit 35 so that the storage containers 33 held by the holding table 32 are moved by the distance equivalent to the intervals between the storage containers 33 on the circumference. Meanwhile, when the detection target 41 is not detected, the control unit 43 rotates the holding table 32 by the drive unit 35 until the detection target 41 is detected by the sensor 42. Thus, each of the storage containers 33 can be stopped at the discharge position P3 in the normal operation.

In the rotation of the holding table 32, the control unit 43 drives the drive unit 35 to rotate the holding table 32 so that the storage containers 33 are moved by the distance that is equivalent to the intervals between the storage containers 33 on the circumference. Thereafter, whether or not the detection target 41 is detected by the sensor 42 is determined. As a result, if the detection target 41 is not detected, it is determined that any one of the plurality of storage containers 33 is not normally held by the holding table 32. Thus, in the normal operation, whether or not the storage containers 33 are normally held by the holding table 32 can be determined.

Further, the control unit 43 rotates the holding table 32 one round by the drive unit 35 in the initial operation. It is determined that all the storage containers 33 are normally held by the holding table 32 when all (six in this embodiment) the detection targets 41 of the storage containers 33 are detected by the sensor 42 during the period in which the holding table 32 is rotated one round. On the other hand, if any one of the detection targets 41 of the storage containers 33 cannot be detected by the sensor 42, it is determined that any one of the plurality of storage containers 33 is not normally held by the holding table 32. Thus, whether or not all the storage containers 33 are normally held by the holding table 32 can be determined in the initial operation.

Summary of Storage Container Detecting Unit

According to the storage container detecting unit 4 configured as above, the one sensor 42 can serve as both the detection unit for rotating the holding table 32 by the drive unit 35 so that the storage containers 33 held by the holding table 32 are sequentially moved to the discharge position and the detection unit for determining whether or not the storage containers 33 are normally held by the holding table 32. Therefore, whether or not the storage containers 33 are normally mounted on the holding table 32 can be determined, based on the detection results by a small number of detection units (sensor 42). Accordingly, the number of parts constituting the storage container detecting unit 4 can be reduced.

Monitoring Unit

The monitoring unit 5 includes the base (31), the holding table (32), the storage containers (33), the drive unit (35), the imaging unit 51, the vibration mechanisms 52 and 53, and the determination unit 54. The base (31), the holding table (32), the storage containers (33), and the drive unit (35) also belong to the storage 3 and the storage container detecting unit 4, as described above (overlapping descriptions for these components belonging also to the storage 3 and the storage container detecting unit 4 are omitted herein).

Imaging Unit

The imaging unit 51 includes a camera 511 (schematically shown in FIG. 3) that captures at least one image of the solid medicine M present in the storage container 33 (the bottom part 333).

The imaging unit 51 is provided at a position where the solid medicine M present in the storage container 33 that has arrived at an imaging position P2 arranged on the circumference at a distance that is an integer multiple of each interval between the storage containers 33 from the discharge position P3, with the rotation of the holding table 32 by the drive unit 35 that is driven by the control unit 43, is shot. That is, the imaging position by the imaging unit 51 is set on the first directional path, so that an image of the solid medicine M present in the storage container 33 that has arrived at the imaging position on the first directional path is captured by the imaging unit 51. Therefore, there is no need to separately provide a detection unit for rotating the holding table 32 by the drive unit 35 (for example, in the storage container detecting unit 4) so that the storage containers 33 held by the holding table 32 are sequentially moved to the imaging position P2. Accordingly, the number of parts constituting the monitoring unit 5 can be reduced.

Vibration Mechanisms

The vibration mechanisms 52 and 53 vibrate the bottom part 333 (and the bottom-side extending part 334) of the storage container 33 before the shooting by the imaging unit 51. The vibration mechanisms 52 and 53 vibrate the bottom part 333 (and the bottom-side extending part 334) of the storage container 33 in the same directions (vibration directions) as the moving directions of the bottom part 333 for opening and closing.

The bottom part 333 of the storage container 33 is vibrated by the vibration mechanisms 52 and 53, so that the solid medicine M can be moved by sliding or rolling on the bottom part 333 of the storage container 33. Thus, the plurality of types (pieces) of solid medicine M can be separated from each other on the bottom part 333. Therefore, the monitoring accuracy can be improved. Moreover, as compared with the case where the bottom part 333 is vibrated in a different direction from the opening and closing direction of the bottom part 333, the bottom part 333 can be vibrated with a simple configuration.

The vibration mechanisms 52 and 53 vibrate the bottom part 333 within a range so as not to create a gap through which the solid medicine M is discharged from the storage container 33. Therefore, a plurality of types (pieces) of the solid medicine M can be separated from each other on the bottom part 333 of the storage container 33 without undesirably dropping the solid medicine M through the created gap. Further, the moving direction of the bottom part 333 when opening and closing the lower opening 331b of the storage container 33 is the horizontal direction, and therefore the solid medicine M can be moved in the horizontal direction. Therefore, a plurality of types (pieces) of the solid medicine M can be more reliably separated from each other on the bottom part 333 of the storage container 33.

In this embodiment, the first vibration mechanism 52 and the second vibration mechanism 53 having different configurations are provided as the vibration mechanisms 52 and 53. There is no limitation to this example, and any one of the first vibration mechanism 52 and the second vibration mechanism 53 can be provided alone as a vibration mechanism.

First Vibration Mechanism

Figure 13:
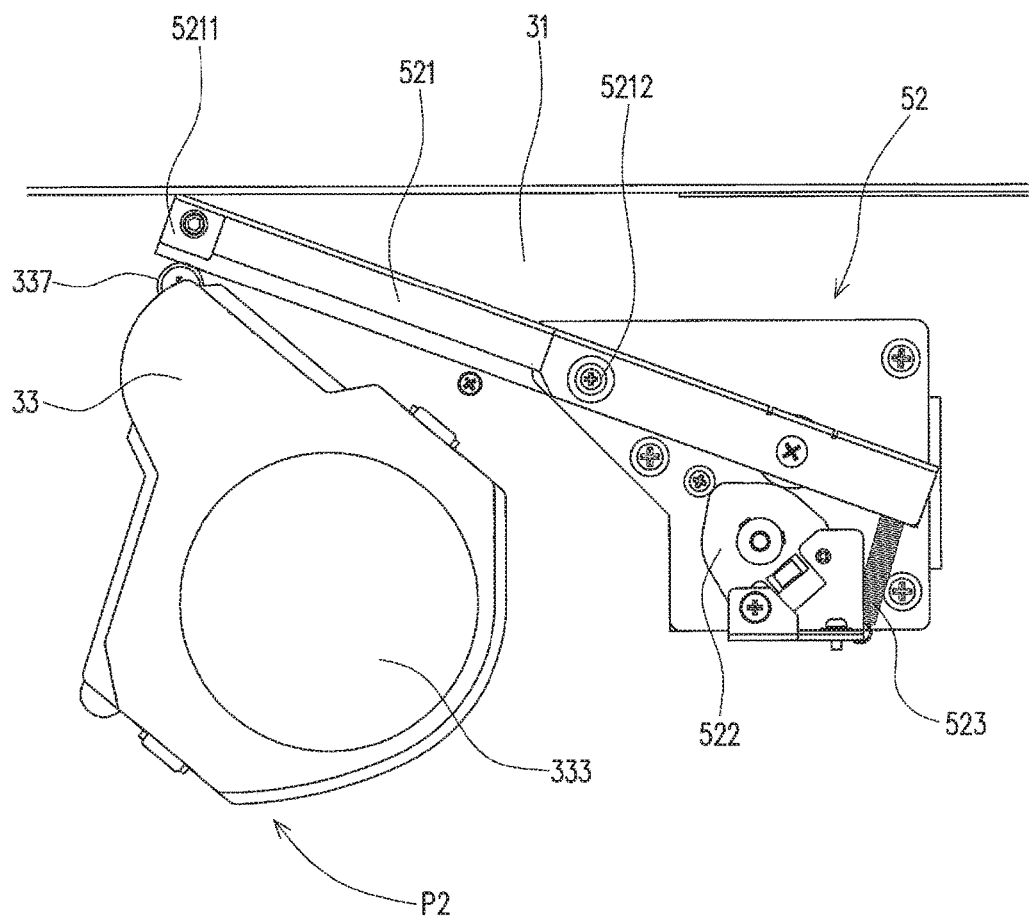
FIG. 13 is a plan view showing a first vibration mechanism of the medicine packaging apparatus with the holding table being omitted.

The first vibration mechanism 52 is provided on the base 31 of the storage 3 and vibrates the bottom part 333 of each storage container 33 that has arrived at the shooting position P2. As shown in FIG. 13, the first vibration mechanism 52 includes a rocking bar 521 supported by the base 31 so as to be pivotable within a specific range. The lateral part on the storage container 33 side at the distal end of the rocking bar 521 serves as the pressing part 5211, which presses the pressed part 337 of the storage container 33 located at the shooting position P2. A rotating cam 522 abuts the proximal end of the rocking bar 521, so that the rocking bar 521 can be rocked by the rotation of the cam 522 within the specific range with a pivot center 5212 serving as the center. Further, a spring 523 is attached to the proximal end of the rocking bar 521 and biases the rocking bar 521 toward a direction in which the pressing part 5211 is moved away from the pressed part 337 of the storage container 33. With the rotation of the cam 522, the pressing part 5211 is moved to come close to the pressed part 337 of the storage container 33 against the bias of the spring 523.

With the rocking of the rocking bar 521, the pressing part 5211 of the first vibration mechanism 52 is reciprocally moved relative to the pressed part 337 of the storage container 33. The pressing part 5211 is reciprocally moved to the pressed part 337 when the drive unit 35 that intermittently drives the holding table 32 is stopped. Thereby, the bottom part 333 can be reliably vibrated with a simple configuration.

Second Vibration Mechanism

The second vibration mechanism 53 is constituted by a plurality (three in this embodiment) of block-shaped bodies 531 provided on the base 31. As compared with the case where the vibration mechanism is provided in the holding table 32, the bottom part 333 of the storage container 33 can be vibrated with a simple configuration.

Figure 14:
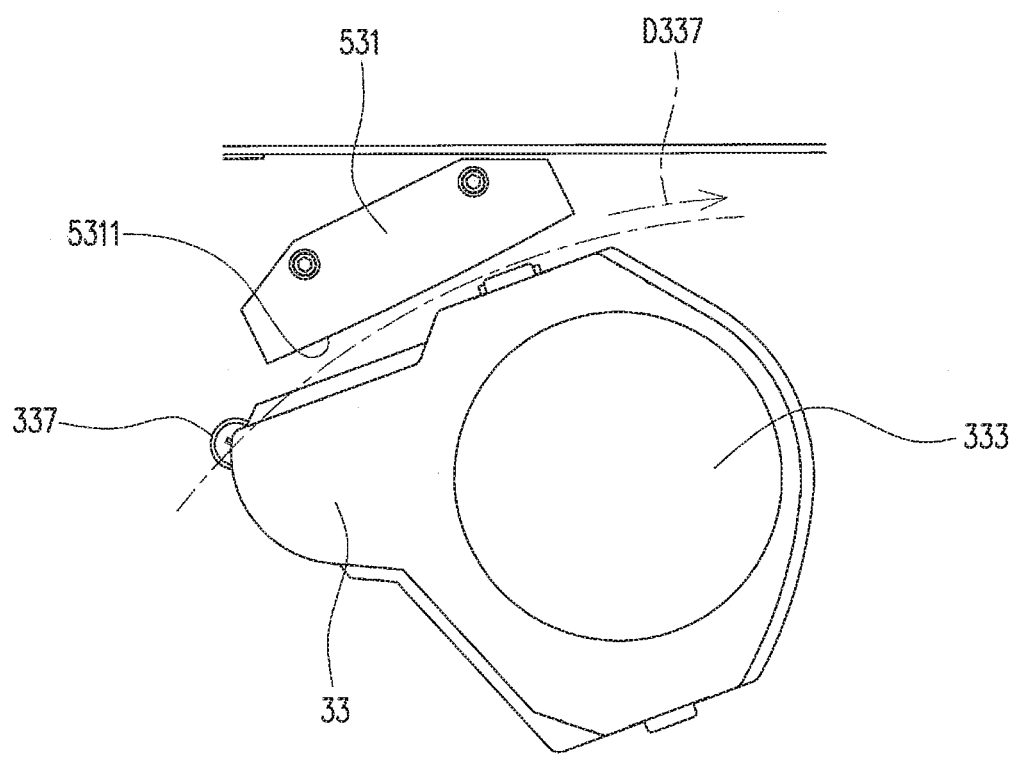
FIG. 14 is a plan view showing a second vibration mechanism of the medicine packaging apparatus with the holding table being omitted.

With the rotation of the holding table 32, the inner surface (surface facing the holding table rotation axis L32) of each of the block-shaped bodies 531 becomes a surface abutting the pressed part 337 that is moving in a direction D337 shown in FIG. 14. The inner surface (abutting surface) abuts the pressed part 337 to function as a pressing part 5311 of the second vibration mechanism 53 that presses the pressed part 337 inwardly of the holding table 32. Therefore, the pressing part 5311 is arranged at a position so as to be capable of abutting the pressed part 337. The pressing part 5311 presses the pressed part 337 with the rotation of the holding table 32 by the drive unit 35. Therefore, a driving source provided only for vibration can be eliminated.

The pressed part 337 is pressed by the pressing part 5311, so that the bottom part 333 of the storage container 33 is moved. FIG. 14 shows a trajectory along which the center of the pressed part 337 moves in the direction D337 by a dashed-dotted line. As shown in the figure, the trajectory becomes closest to the pressing part 5311 at the center in the longitudinal direction of the pressing part 5311. Therefore, the bottom part 333 is located at the maximum movement position when the pressed part 337 abuts the center in the longitudinal direction of the pressing part 5311. As the holding table 32 rotates, and the storage containers 33 move on the inner side of the block-shaped bodies 531, the bottom part 333 moves to reach the maximum movement position and then to be returned to the original position.

The plurality (three points in this embodiment) of pressing parts 5311 are arranged at intervals along the moving path of the storage containers 33. Therefore, the plurality of pressing parts 5311 sequentially press the pressed parts 337 of the storage containers 33 with the rotation of the holding table 32, thereby vibrating the storage containers 33 multiple times (three times in this embodiment). Accordingly, a plurality of types (pieces) of the solid medicine M can be reliably separated from each other.

The plurality of block-shaped bodies 531 are arranged so that the pressing parts 5311 do not press the pressed parts 337 of two or more of the plurality of storage containers 33 in the same pressing state (specifically, with the same pressure) at any moment. That is, on the holding table 32, the arrangement intervals between the plurality of storage containers 33 are different from the arrangement intervals between the plurality of pressing parts 5311. For example, in the case of using three block-shaped bodies 531 as in this embodiment, the arrangement intervals can be set so that, when one of the three block-shaped bodies 531 is at the moment that the pressing part 5311 starts abutting the pressed part 337, another one is at the moment that the pressing part 5311 abuts the pressed part 337 with the bottom part 333 being located at the maximum movement position, and still another one is at the moment that the pressing part 5311 does not abut the pressed part 337. Therefore, the bottom parts 333 of two or more of the storage containers 33 are not subjected to the same pressure, thereby preventing the same vibration state. Accordingly, the load applied to the drive unit 35 can be reduced.

Summary of Vibration Mechanisms

As described above, the storage containers 33 include the pressed parts 337 and the biasing parts 336, and the vibration mechanisms 52 and 53 respectively include the pressing parts 5211 and 5311 configured to press the pressed parts 337 of the storage containers 33. The pressed parts 337 are pressed by the pressing parts 5211 and 5311, and thereby the bottom parts 333 of the storage containers 33 are moved toward the open direction (the other of the specific vibration directions) that is a direction in which the bottom parts 333 are in the open state against the biasing force by the biasing parts 336. Therefore, when the pressure to the pressed parts 337 by the pressing parts 5211 and 5311 is released, the bottom parts 333 of the storage containers 33 are moved toward the closing direction (one of the specific vibration directions) by the biasing force of the biasing part 336. Thus, the bottom parts 333 can be vibrated with a simple configuration.

Determination Unit

The determination unit 54 performs determination for the monitoring based on the image obtained by the imaging unit 51. Specifically, the determination unit 54 determines whether or not the solid medicine M inside each of the plurality of storage containers 33 matches the prescription data. As a method for the determination, a known image recognition method can be used. The determination unit 54 can be provided separately from the control unit 43 of the storage container detecting unit 4 or can be provided together within the control unit of the medicine packaging apparatus 1, for example.

The embodiments of the present invention have been described above but are just examples. The present invention is not limited to the aforementioned embodiments, and various modifications can be made without departing from the gist of the present invention.

For example, the medicine conveying apparatus of the aforementioned embodiment is provided in the medicine packaging apparatus, but the medicine conveying apparatus can be provided in various apparatuses that handle medicine.

Further, the medicine packaging apparatus 1 of the aforementioned embodiment includes the monitoring unit 5 serving as a processing unit and configured to perform the monitoring using an image, but the processing unit is not limited to this configuration. Examples of the processing can include shooting (not relating to the monitoring), weight measurement of the solid medicine M, and removal of medicine powder adhering to the surface of the solid medicine M (particularly, in the form of tablets or capsules), and the processing unit can perform the various kinds of processing on the solid medicine M.

Further, the holding table 32 of the aforementioned embodiments is provided on the base 31 so as to be rotatable about a predetermined axis (the holding table rotation axis L32), but there is no limitation to this configuration. That is, the medicine packaging apparatus 1 can be configured to include the holding table 32 that is configured to hold the plurality of storage containers 33 at intervals on a predetermined imaginary line so as to be individually detachable and is provided to be movable with respect to the base 31 so that the held storage containers 33 can be moved (not rotated) along the imaginary line, the detection unit (the sensor 42) that is provided on the base 31 and is configured to detect the detection target 41 of the storage container 33 that has arrived at the detection position on the imaginary line, and the control unit 43 that is configured to rotate the holding table 32 by the drive unit 35 and determines whether or not the storage containers 33 are normally held by the holding table 32 based on the detection results by the detection unit (the sensor 42). The shape of the imaginary line is circular with the holding table rotation axis L32 serving as the center in the aforementioned embodiments, but it can be a linear or curved.

That is, the circulation path through which the plurality of storage containers 33 are circulated so as to make a round along the circulation path is not limited to the circular path as in the aforementioned embodiment. For example, the path can be elliptical or oval, or also can be formed to be elongated and have an intermediate portion that is appropriately curved. Further, a path curved along the imaginary line can be set as the first directional path, and a linear path connecting the starting point and the end point of the first directional path can be set as the second directional path. Supposed that the circulation path is a "D"-shaped path in planer view, the curved line of the "D" shape is the first directional path, and the vertical line is the second directional path, for example. Moreover, the circulation path is not limited to a path on a single plane and can be a three-dimensional path. In this way, the circulation path can be configured to have various shapes.

Further, the moving velocities of the plurality of storage containers 33 when the plurality of storage containers 33 are circulated along the circulation path so as to make a round are constant in the aforementioned embodiment, but the moving velocities also can be varied in the circulation path. Further, the length of the second directional path in the aforementioned embodiment is smaller than the length of the first directional path, but in the case where the moving velocities of the plurality of storage containers 33 are set larger in the first directional path than in the second directional path, the length of the second directional path can be set equal to the length of the first directional path, or the length of the second directional path can be set larger than the length of the first directional path, for example.

Further, the solid medicine M can be configured to be discharged from the storage 3, for example, by opening and closing a lateral part of the storage 3, without opening and closing the bottom part 333 of each storage container 33.

Further, the bottom part 333 of the storage container 33 in the aforementioned embodiment is openable and closable in the horizontal direction, but there is no limitation to this configuration, and the bottom part 333 can be openable and closable in the vertical direction, for example.

Figure 15A:
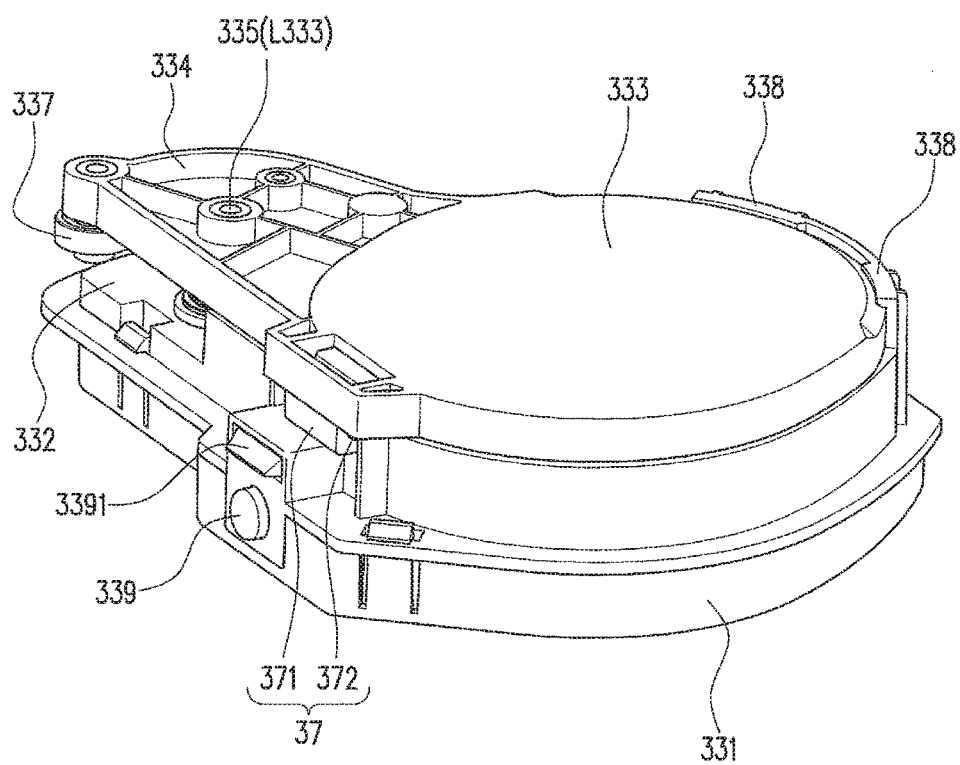
FIG. 15A is an upside-down perspective view showing a storage container of another embodiment of the medicine packaging apparatus.
Figure 15B:
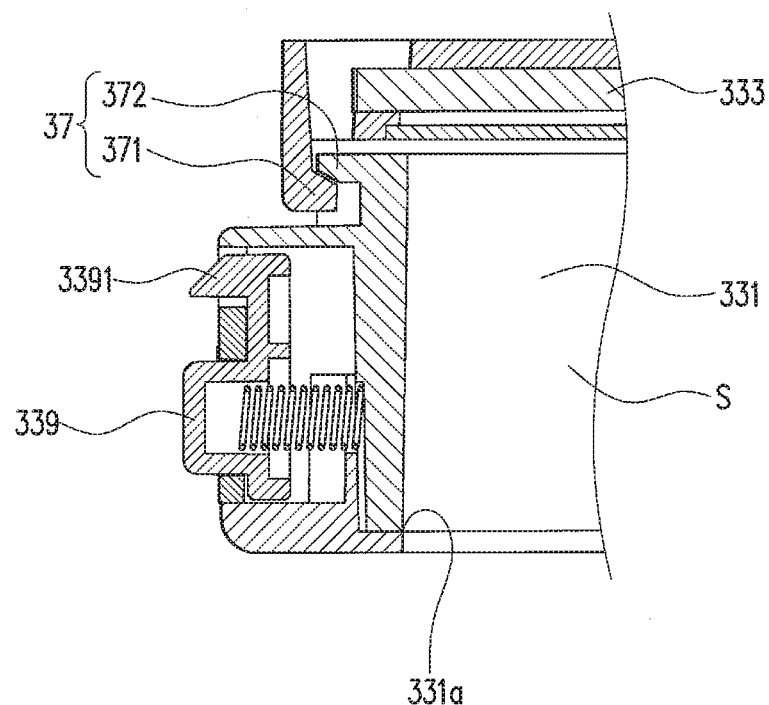
FIG. 15B is an enlarged sectional view showing a main part of another support unit of a storage container of another embodiment of the medicine packaging apparatus.

Further, another support part 37 configured to support the bottom part 333 so as to suppress downward displacement can be provided, in addition to the support part 338. For example, as shown in FIG. 15A and FIG. 15B, the other support part 37 is formed on the end edges of the frame 331 and the bottom part 333 on the opposite side of the support part 338 in the pivot directions when in the opening and closing of the bottom part 333. The other support part 37 in this example is constituted by an engaging part 371 formed in the bottom part 333 and an engagement receiving part 372 formed in the frame 331. As shown in FIG. 15B, the engaging part 371 has an L-shaped cross section, that is, the engaging part 371 is a portion extending upwardly from the vicinity of the circumferential edge of the bottom part 333 and thereafter extending inwardly from the upper end. The engagement receiving part 372 is a portion extending outwardly from the frame 331. The other support part 37 in this example is formed to be displaced outwardly of the outer circumferential edge of the bottom part 333, but there is no limitation to this configuration, and various configurations can be employed as long as the configuration is such that the bottom part 333 is supported by engagement between the frame 331 and the bottom part 333.

Thus, by providing the other support part 37 in addition to the support part 338, the gap in the vertical direction between the frame 331 and the bottom part 333 can be reduced in the closing state. Therefore, leakage of the solid medicine M can be further reliably prevented, as compared with the case where only the support part 338 is provided.

Finally, the configuration and action of the aforementioned embodiment (including the modifications) will be summarized. A medicine conveying apparatus (storage) 3 is configured to convey solid medicine M, the medicine conveying apparatus (storage) 3 including: a plurality of storage containers 33 configured to temporarily store the medicine M; and a circulation driving unit 35 configured to circulate the plurality of storage containers 33 so as to make a round along a circulation path, wherein an introduction position P1 and a discharge position P3 are set on the circulation path, so that the medicine M is introduced into each of the plurality of storage containers 33 that has arrived at the introduction position P1, and the medicine M is discharged from each of the plurality of storage containers 33 that has arrived at the discharge position P3, the circulation path includes a first directional path that extends from the introduction position P1 to the discharge position P3 and a second directional path that extends from the introduction position P1 to the discharge position P3 and is different from the first directional path, and the circulation driving unit 35 allows an operator to select one of the first directional path and the second directional path through which the plurality of storage containers 33 are conveyed from the introduction position P1 to the discharge position P3 and circulates the plurality of storage containers 33 through the selected path.

According to the aforementioned configuration, the operator can select whether the plurality of storage containers 33 are to be conveyed from the introduction position P1 to the discharge position P3 through the first directional path or through the second directional path in the circulation path. Therefore, the medicine M can be conveyed from the introduction position P1 to the discharge position P3 through the path that is convenient for the conveyance in the circulation path.

Further, the configuration can be such that the processing unit 5 configured to perform various kinds of processing on the medicine M inside each of the plurality of storage containers 33 is provided in the course of the first directional path, and the second directional path has a smaller length than the first directional path.

According to the aforementioned configuration, in the case where no processing is performed on the medicine M, the medicine M can be conveyed quickly through the second directional path having a small path length.

Further, the configuration can be such that, in the case where the processing unit 5 is actuated, the plurality of storage containers 33 are conveyed from the introduction position P1 to the discharge position P3 through the first directional path, and in the case where the processing unit 5 is not actuated, the plurality of storage containers 33 are conveyed from the introduction position P1 to the discharge position P3 through the second directional path.

According to the aforementioned configuration, the path from the introduction position P1 to the discharge position P3 can be changed in the circulation path, depending on the case where the processing unit 5 is actuated or not actuated. Therefore, the medicine M can be efficiently conveyed, depending on the actuation situation of the processing unit 5.

Further, the configuration can be such that the processing unit 5 includes the imaging unit 51 configured to shoot the medicine M present inside each of the plurality of storage containers 33, and a shooting position of the imaging unit 51 is set on the first directional path, so that an image of the medicine M present inside each of the plurality of storage containers 33 that has arrived at the shooting position is shot by the imaging unit 51.

According to the aforementioned configuration, since the imaging unit 51 is provided, the image of the solid medicine M present inside each of the plurality of storage containers 33 on the first directional path can be shot.

Further, the configuration can be such that the processing unit (monitoring unit) 5 further includes the determination unit 54 configured to make a determination for monitoring, based on the image obtained by the imaging unit 51.

According to the aforementioned configuration, since the determination unit 54 is provided in addition to the imaging unit 51, the image monitoring can be performed on the solid medicine M present inside each of the plurality of storage containers 33 on the first directional path.

According to the present invention, the medicine M can be conveyed from the introduction position P1 to the discharge position P3 through the path that is convenient for the conveyance in the circulation path. Therefore, the medicine conveying apparatus (storage) 3 in which the path of the medicine M can be selected corresponding to the situation can be provided with a simple configuration.

REFERENCE SIGNS LIST

1: Medicine packaging apparatus
2: Feeder
3: Medicine conveying apparatus, Storage
33: Storage container
35: (Circulation) driving unit
5: Processing unit, Monitoring unit
51: Imaging unit
54: Determination unit
6: Packaging unit
D32: Direction along first directional path
D32a: Direction along second directional path
P1: Introduction position
P3: Discharge position
M: Medicine, Solid medicine

The invention claimed is:

1. A medicine conveying apparatus configured to convey solid medicine, comprising:
   a plurality of storage containers configured to temporarily store the medicine; and
   a circulation driving unit configured to circulate the plurality of storage containers along a circulation path, wherein
   an introduction position and a discharge position are set on the circulation path, so that the medicine is introduced into each of the plurality of storage containers that has arrived at the introduction position, and the medicine is discharged from each of the plurality of storage containers that has arrived at the discharge position,
   the circulation path includes a first directional path that extends from the introduction position to the discharge position and a second directional path that extends from the introduction position to the discharge position and is different from the first directional path,
   a processing unit configured to perform processing of the medicine inside each of the plurality of storage containers is provided in the course of the first directional path,
   the second directional path has a smaller length than the first directional path,
   when the processing unit is actuated, the plurality of storage containers are conveyed from the introduction position to the discharge position through the first directional path, and
   when the processing unit is not actuated, the plurality of storage containers are conveyed from the introduction position to the discharge position through the second directional path.

2. The medicine conveying apparatus according to claim 1, wherein
   the circulation driving unit allows an operator to select one of the first directional path and the second directional path through which the plurality of storage containers are conveyed from the introduction position to the discharge position and circulates the plurality of storage containers through the selected path.

3. A medicine conveying apparatus configured to convey solid medicine, comprising:
   a plurality of storage containers configured to temporarily store the medicine; and
   a circulation driving unit configured to circulate the plurality of storage containers along a circulation path, wherein
   an introduction position and a discharge position are set on the circulation path, so that the medicine is introduced into each of the plurality of storage containers that has arrived at the introduction position, and the medicine is discharged from each of the plurality of storage containers that has arrived at the discharge position,
   the circulation path includes a first directional path that extends from the introduction position to the discharge position and a second directional path that extends from the introduction position to the discharge position and is different from the first directional path,
   a processing unit configured to perform processing of the medicine inside each of the plurality of storage containers is provided in the course of the first directional path,
   the second directional path has a smaller length than the first directional path,
   the processing unit comprises an imaging unit configured to capture an image of the medicine present inside each of the plurality of storage containers, and
   an imaging position of the imaging unit is set on the first directional path, so that an image of the medicine present inside each of the plurality of storage containers that has arrived at the imaging position is captured by the imaging unit.

4. The medicine conveying apparatus according to claim 3, wherein
   the processing unit further comprises a determination unit configured to make a determination for monitoring based on the image obtained by the imaging unit.

5. A medicine conveying apparatus configured to convey solid medicine, comprising:
   a plurality of storage containers configured to temporarily store the medicine; and
   a circulation driving unit configured to circulate the plurality of storage containers along a circulation path, wherein
   an introduction position and a discharge position are set on the circulation path, so that the medicine is introduced into each of the plurality of storage containers that has arrived at the introduction position, and the medicine is discharged from each of the plurality of storage containers that has arrived at the discharge position,
   the circulation path includes a first directional path that extends from the introduction position to the discharge position and a second directional path that extends from the introduction position to the discharge position and is different from the first directional path,
   a processing unit configured to perform processing of the medicine inside each of the plurality of storage containers is provided in the course of the first directional path,
   the second directional path has a smaller length than the first directional path, when the processing unit is actuated, the plurality of storage containers are conveyed from the introduction position to the discharge position through the first directional path, when the processing unit is not actuated, the plurality of storage containers are conveyed from the introduction position to the discharge position through the second directional path, the processing unit comprises an imaging unit configured to capture an image of the medicine present inside each of the plurality of storage containers, and an imaging position of the imaging unit is set on the first directional path, so that an image of the medicine present inside each of the plurality of storage containers that has arrived at the imaging position is captured by the imaging unit.

6. The medicine conveying apparatus according to claim 5, wherein the processing unit further comprises a determination unit configured to make a determination for monitoring based on the image obtained by the imaging unit.

* * * * *